United States Patent
Takase et al.

(10) Patent No.: US 6,381,513 B1
(45) Date of Patent: *Apr. 30, 2002

(54) ELECTRONIC INFORMATION DISTRIBUTING TERMINAL EQUIPMENT

(75) Inventors: Satoshi Takase, Akishima; Masaharu Kubo, Hachioji; Takeshi Munakata, Tokyo, all of (JP)

(73) Assignee: Hitachi, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,183
(22) PCT Filed: Oct. 23, 1995
(86) PCT No.: PCT/JP95/02176
§ 371 Date: Jul. 21, 1997
§ 102(e) Date: Jul. 21, 1997
(87) PCT Pub. No.: WO96/24105
PCT Pub. Date: Aug. 8, 1996

(30) Foreign Application Priority Data

Jan. 31, 1995 (JP) ............................................. 7-34421

(51) Int. Cl.[7] ............................ G06F 17/00; G06F 7/08
(52) U.S. Cl. ..................... 700/231; 700/237; 235/381; 455/2.01; 345/501; 345/547
(58) Field of Search .......................... 348/6, 7; 455/6.3, 455/2.01, 3.06; 345/501–506, 521, 507, 203, 547, 564; 705/1, 2, 26, 27; 711/100, 103, 115; 235/381; 700/231, 237

(56) References Cited

U.S. PATENT DOCUMENTS

| | | | | |
|---|---|---|---|---|
| 5,339,239 A | * | 8/1994 | Manabe et al. ................. | 705/1 |
| 5,390,148 A | * | 2/1995 | Saito ...................... | 365/185.08 |
| 5,396,558 A | * | 3/1995 | Ishiguro et al. ............... | 380/25 |
| 5,436,971 A | * | 7/1995 | Armbrust et al. ............. | 380/23 |
| 5,457,780 A | * | 10/1995 | Shaw et al. .................. | 345/502 |
| 5,504,701 A | * | 4/1996 | Takahashi et al. ..... | 365/185.04 |
| 5,590,306 A | * | 12/1996 | Watanabe et al. ............. | 711/115 |
| 5,682,202 A | * | 10/1997 | Watanabe et al. ............ | 348/231 |
| 5,734,589 A | * | 3/1998 | Kostreski et al. ........... | 345/327 |
| 5,748,737 A | * | 5/1998 | Daggar ........................ | 380/24 |
| 5,749,735 A | * | 5/1998 | Redford et al. ......... | 434/307 R |
| 5,769,269 A | * | 6/1998 | Peters ........................... | 221/7 |
| 5,802,551 A | * | 9/1998 | Komatsu et al. ............ | 711/103 |
| 5,867,821 A | * | 2/1999 | Ballantyne et al. ............ | 705/2 |
| 5,884,140 A | * | 3/1999 | Ishizaki et al. ................. | 455/2 |
| 5,914,471 A | * | 6/1999 | Pavert ........................ | 235/380 |
| 6,021,390 A | * | 2/2000 | Satoh et al. .................... | 705/1 |

OTHER PUBLICATIONS

V. M. Cordonnier, Smart Cards: Present and Future Applications and Techniques, Electronics & Comminication Enginnering Journal, Oct. 1991, pp. 207–212.*

D. Sternglass, The Future is in the PC Cards, IEEE Spectrum, Jun. 1992, pp. 46–50.*

* cited by examiner

Primary Examiner—Ulka J. Chauhan
(74) Attorney, Agent, or Firm—Mattingly, Stanger & Malur, P.C.

(57) ABSTRACT

Herein disclosed is an electronic information distributing terminal equipment for storing and distributing the electronic information containing a text information and a corresponding motion image information in a memory card equipped with an electrically reloadable nonvolatile semiconductor memory device, which equipment comprises a card stock having a plurality of memory cards stored in advance with the information which has been transmitted through a communication interface for transmitting the electronic information to be distributed, wherein the electronic information is distributed by discharging the memory card even in response to a demand for distributing only the electronic information, and wherein the memory card inserted with the demand is utilized again as a new card stock. As a result, it is possible to provide an electronic information distributing terminal equipment capable of efficiently conducting the service of distributing the electronic information containing text information and corresponding motion image information.

7 Claims, 19 Drawing Sheets

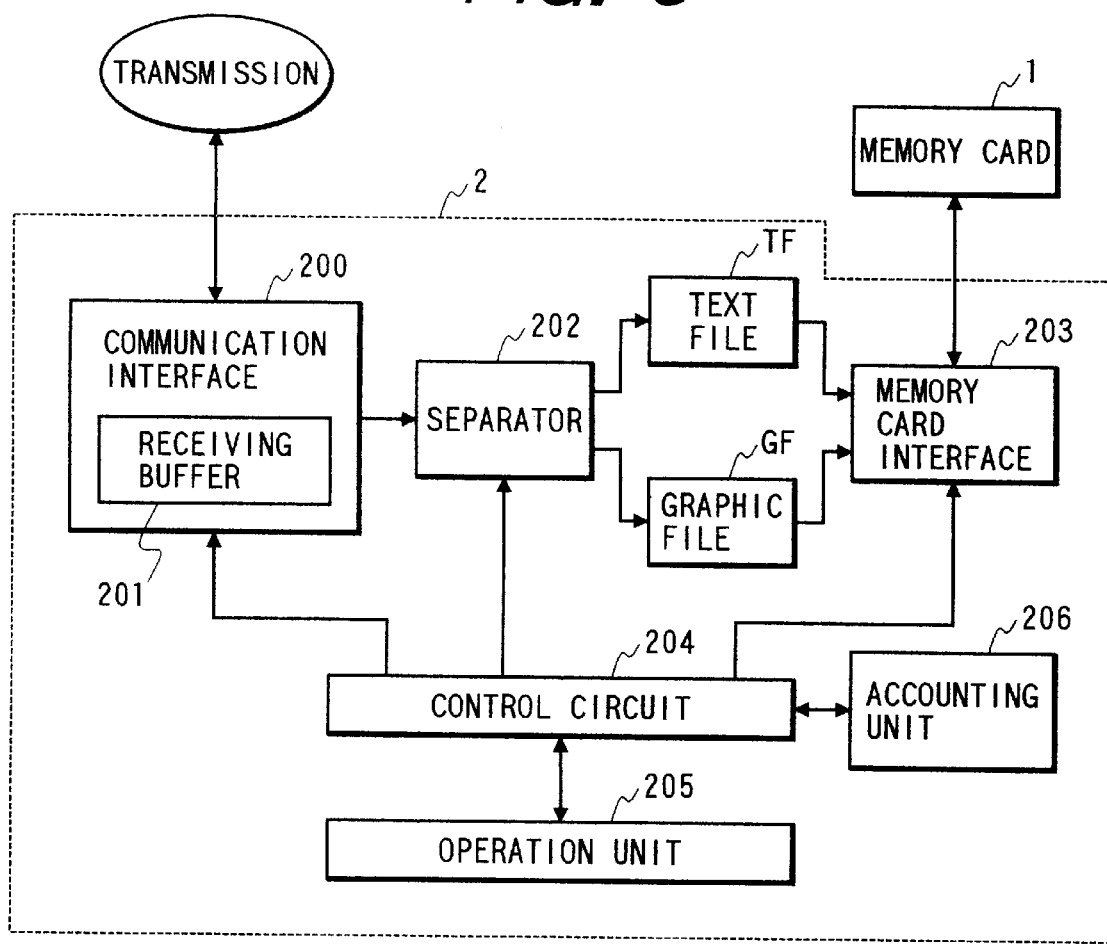

ELECTRONIC INFORMATION DISTRIBUTING TERMINAL EQUIPMENT

TECHNICAL FIELD

The present invention relates to a technique for distributing electronic information (such as a kind of multimedia information) including text information and its corresponding motion image information, a technique for reproducing the distributed electronic information, and a technique for utilizing a memory card having an electrically rewritable nonvolatile semiconductor memory as a medium for distributing the electronic information. More particularly, the present invention relates to a technique which is effective if applied to an electronic newspaper distributing terminal and a distributed electronic newspaper reproducing system for realizing an application to be called a kind of motion image electronic newspaper, for example.

BACKGROUND ART

In multimedia at present, newspapers or TV programs form a major part. Newspapers are the most convenient and portable information media. However, as recording and display media, newspapers are excellent in the quality of displaying text or documents, but their graphic information is limited to static images. On the other hand, the TV intrinsically handles the graphic information and is excellent in the quick service of information. However, the TV is inferior in portability to newspapers and substantially unable to allow free access to desired information. The drawback of TV is compensated for by the video recorder which has a poor quality in expressing text and is limited in portability and quick service. Thanks to the recent development of the electronic technique, practices are being started of electronic books which use various electronic recording media and liquid crystal displays in place of the books of the prior art having paper media. This trend is described on pages 105 to 110 of Nikkei Electronics (1–17, No. 599 issued by Kabushiki Gaisha Nikkei BP in 1994), for example. In Japanese Patent Laid-Open No. 181803/1993, on the other hand, moreover, there is disclosed an electronic publishing system which uses an optical disk as the memory medium to record the electronic information containing graphic information and to reproduce the recorded information.

However, those prior arts have taken no consideration into the point of reproducing and displaying the electronic information, in which the mode of displaying the graphic information with respect to the text information is freely switched between the static image display and the motion image display. Neither considered is a system for distributing such electronic information.

We have investigated the portability of a terminal for reproducing the distributed electronic information, the quick serviceability of the distribution of the electronic information, and the simultaneous accesses to the static image and the motion image. After these investigations, we have found that it is desirable for improving the convenience and performance of the information display to display the static image together with the text thereby to switch the static image freely to the motion image. Of these, it is advantageous for reducing the size and improving the reliability of the operation to exemplify the electronic information storing media by a memory card which is removably attached while having no substantial mechanical action. For spreading such a reproducing/displaying terminal, moreover, we have found that it is necessary to develop the device or system for distributing the electronic information and to consider the acceleration of the process in view of the characteristics of the service for distributing the electronic information.

An object of the present invention is to provide an electronic information distributing terminal capable of efficiently conducting the service of distributing the electronic information including text information and its corresponding motion image information.

Another object of the present invention is to provide an electronic information distributing terminal capable of improving the reliability of the distribution service with an electrically rewritable nonvolatile semiconductor memory card for distributing the electronic information.

Still another object of the present invention is to provide a distributed electronic information reproducing system capable of displaying the file information and the motion image information clearly and displaying more information if necessary.

A further object of the present invention is to provide a memory card as an individual storage device optimized for distributing the electronic information.

DISCLOSURE OF THE INVENTION

In the present invention, an electronic information distributing terminal (2A) for writing electronic information including text information and its corresponding motion image information into a memory card (1) equipped with an electrically rewritable nonvolatile semiconductor memory to distribute the information, comprises a card stock (225) of a plurality of memory cards that hold the information distributed through a communication interface (200), wherein the electronic information is distributed by discharging the memory card even in response to a demand for distributing only the electronic information, and wherein the memory card inserted with the demand is utilized as a new card stock (225).

Since the memory card can be repeatedly utilized but is more expensive than the video tape, the electronic information distributing terminal other than those used personally or at home has to be considered to support the two electronic information distribution modes, i.e., to distribute the electronic information exclusively and to distribute the electronic information by vending the memory card, too. At this time, it the electronic information distributing terminal having the card stock stored in advance with the electronic information is adopted, the discharge of the memory card of the card stock even in the case, in which the purchaser has inserted his memory card to demand the distribution of only the electronic information, makes it unnecessary to allow each inserted memory card to store the electronic information thereby to accelerate the service of the information distribution. Since the inserted memory card is then utilized as a new card stock, the card stock is not reduced unless a memory card is newly purchased, so that the card stock need not be frequently supplied. Since the electronic information to be stored in the memory card is received through the communication interface, the distribution of the information having a content of quickness such as newspaper information can be covered to require no work for updating the information to be distributed.

Information can be rewritten only a limited number of times in the nonvolatile semiconductor memory. In order to retain the reliability of the information distribution, the memory card has an area (MEM1) for recording the information indicating the maximum number of rewrite operations, and an area (MEM2) for recording the actual number of rewrite operations, wherein when the actual number reaches a predetermined value, the memory card ends its service as a new card stock (225) so that the electronic information is rewritten by updating the actual number of rewrite operations till it reaches the predetermined value.

The electronic information distributing terminal can be realized like an automatic vendor by providing an operation unit (205, 226, 2266) for selecting the kind of the electronic information demanding the distribution; and accounting means (206, 229) for collecting the charge for the distributing of the electronic information.

According to another aspect, an electronic information distributing terminal for writing electronic information including text information and its corresponding motion image information into a memory card (1) equipped with an electrically rewritable nonvolatile semiconductor memory to distribute the information, comprises a communication interface (200); a data buffer (411, 221) for temporarily storing the electronic information fed from the communication interface; a memory card interface (410, 230) to which is removably attached a memory card equipped with an electrically rewritable nonvolatile semiconductor memory for allowing the memory card to separately store the text information and the corresponding motion image information from the data buffer; an operation unit (413, 232) for selecting the electronic information to be stored in the memory card from the data buffer; and accounting means (206, 229) for collecting the charge for the electronic information selected in the operation unit. In this electronic information distributing terminal, it suffices both the improvement in the information distribution service and the propriety for the charge to have the data buffer for temporarily storing a plurality of electronic information fed from the communication interface and to charge the cost for the distribution of desired information when this information is selected from the electronic information stored in the data buffer.

A distributed electronic information reproducing system (4), comprising display control means (402) that removably receives a memory card having an electrically rewritable nonvolatile semiconductor memory, displays a static image on a display unit (403) using a portion of the text information and the corresponding motion image information read from the memory card, and reproduces a motion image from the static image on the basis of an instruction from an operation unit (405, 413). Thus, the information can be displayed clearly and more information can be displayed the, if necessary, by displaying static image from the text information and a corresponding portion of the motion image information and if necessary, a motion image from the static image.

The distributed electronic information reproducing system (4) is enabled to receive the distribution of information directly by further comprising: a communication interface (200); a data buffer (411) for temporarily storing the electronic information including text information and the corresponding motion image information received through the communication interface; and a memory card interface (410) for allowing the memory card to separately store the text information and the corresponding motion image information in the electronic information transferred from said data buffer, whereby it can receive the distribution of information directly.

In electronic information storing mode on a memory card for facilitating accesses to motion image information and text information corresponding to each other, either of the motion image information or the text information separated from each other is stored starting with the first address of a predetermined storage area (MEM6), whereas the other is stored starting with the last address of the predetermines storage area (MEM6).

BRIEF DESCRIPTION OF DRAWINGS

FIG. 3 is a block diagram showing one example of the load terminal exemplifying the dedicated write terminal or home write terminal;

BEST MODE FOR CARRYING OUT THE INVENTION

The present invention will be described in more detail with reference to the accompanying drawings.

Figure 1:
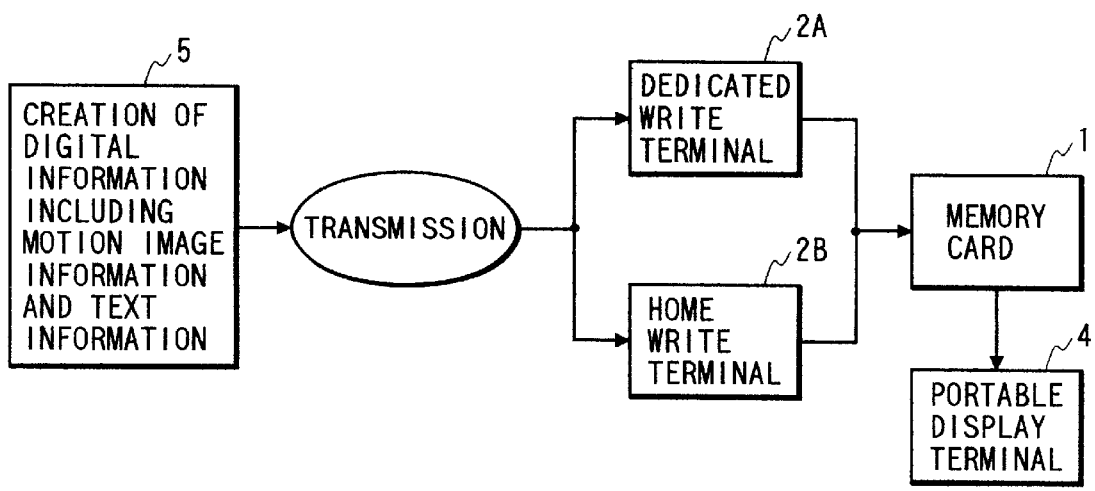
FIG. 1 is a block diagram schematically showing the entirety of the system for distributing the electronic information.

FIG. 1 is a block diagram schematically showing the entirety of a system for distributing electronic information. This electronic information is digital information (such as a kind of multimedia information) including text information and motion image information (as will be shortly referred to as image information) corresponding to the former. For distributing the electronic information in this system, there is utilized as the storage medium a memory card 1 which is equipped with an electrically rewritable nonvolatile semiconductor memory. The memory card makes use of a nonvolatile memory such as an EPROM, an EEPROM or a flash memory. In case the system, as shown in FIG. 1, is used to realize an application to be called a kind of motion image electronic newspaper, an electronic information distributing source (or circulating source) 5 is provided with a data base for newspapers and a data base for TV to create the digital information including the motion image information and the text information from the latest information. For example, the text information is the character code information of the newspaper, and the motion image information is the TV motion image information corresponding to that newspaper. The TV data base usually exploits the image data stored in a VTR. Such electronic information (as will be shortly referred to as electronic newspaper information) for the electronic newspaper can be created for several newspapers of individual newspaper publishing companies.

The aforementioned electronic information is transmitted to the distribution terminal through a telephone line, an ISDN line or a PC-LAN, or wirelessly. In FIG. 1, the electronic information distribution terminal is representatively exemplified by a dedicated write terminal 2A and a home write terminal 2B. The electronic information distributing terminal (write terminal) such as the dedicated write terminal 2A or the home write terminal 2B stores the electronic information in the memory card 1 for distribution. In either the terminal 2A or 2B, the electronic information, as transmitted thereto, is stored in the memory card 1 acting as the solid-state storage medium. The dedicated write terminal 2A can be realized to distribute the electronic information like the automatic vendor, and the home write terminal 2B can also be realized in a form incorporated in a home or personal system such as a telephone, a facsimile, the receiver of a cable TV or a personal computer. According to the embodiment shown in FIG. 1, the electronic information stored in the memory card is reproduced by a portable display terminal 4. This portable display terminal 4 has the function of receiving the information through the home write terminal 2B and storing the received information in the memory card 1. In other words, the home write terminal 2B and the portable display terminal 4 may be integrated with each other. The portable display terminal 4 is equipped with a display so that the text information and the corresponding static and motion image information are given to the user. In this specification, the motion image information is grasped as a concept containing voice data, if necessary.

Figure 2:
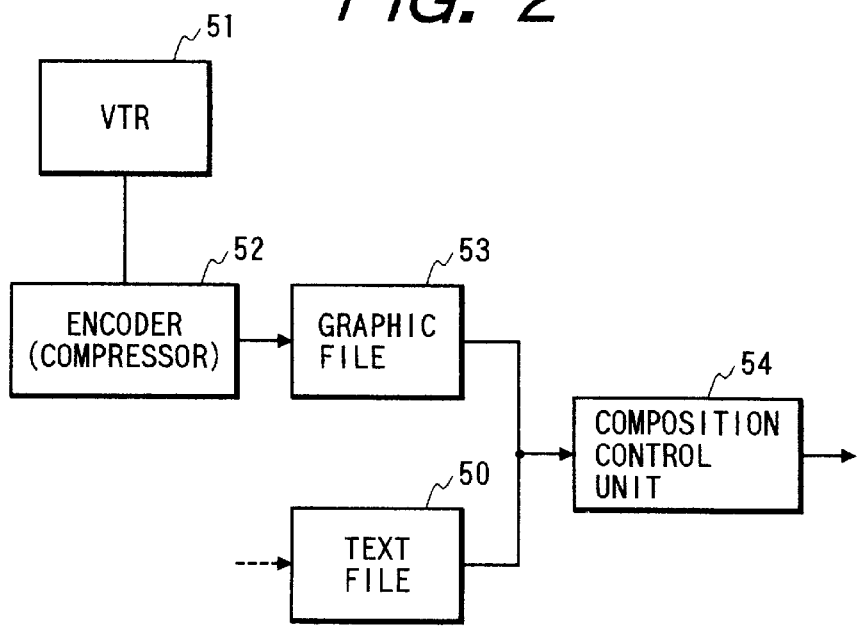
FIG. 2 is a block diagram showing one example of the distribution source or publishing source of the electronic information.

FIG. 2 shows one example of the electronic information distributing source 5. In FIG. 2, a text file 50 to be used for making a newspaper is used as it is as the file information. The text information, as stored in the text file 50, is composed of a set of character codes. The data type may be of text or any other. The motion image information may be a graphic file 53 compressed by an encoder (or compressor) 52 from the recorded data of a VTR 51 that stores the information corresponding to the news item and broadcasted in the TV. The information, as stored in the text file 50 and graphic file 53, is transmitted after it is composed by a composition control unit 54 into a predetermined type matching either the transmission protocol or the information processing type of the write terminal. The contents of the composition control are to pair the corresponding text information and motion image information, to assign the motion image information to the text information, and to index and synthesize the information so as to facilitate the display at the portable display terminal equipment.

FIG. 3 shows a write terminal 2 as an example of the dedicated write terminal 2A or the home write terminal 2B. The write terminal 2, as shown in FIG. 3, is equipped with a communication interface 200 which can be connected with the electronic information distributing source 5 by making use of a predetermined transmission line. The communication interface 200 is equipped with a receiving buffer 201. This receiving buffer 201 temporarily stores the information inputted through the communication interface 200, so as to absorb the difference in the data processing rate between the inside and outside of the write terminal 2. The electronic information thus stored in the receiving buffer 201 is separated by a separator 202 into the text information and the motion image information. The text information is expressed as a text file TF whereas the motion image information is expressed as a graphic file GF. The text file TF and the graphic file GF are stored in the memory card 1 through a memory card interface 203. This memory card interface 203 removably receives the memory card 1 holding the aforementioned text file TF and graphic file GF separately of each other. Numeral 204 designates a control circuit for controlling the entirety; numeral 205 designates an operation unit arranged with various operation buttons; and numeral 206 designates an accounting unit for charging the fare required for distributing the electronic information. In case the write terminal 2 is the dedicated load terminal 2A like the automatic vendor, the accounting unit 206 collects the fare or changes the balance of the prepaid card. In case the write terminal 2 is the home write terminal 2B, the accounting unit 206 returns the use content such as the identification information or accounting information of the user to the electronic information distributing source 5 through the communication interface 200.

Figure 4A:
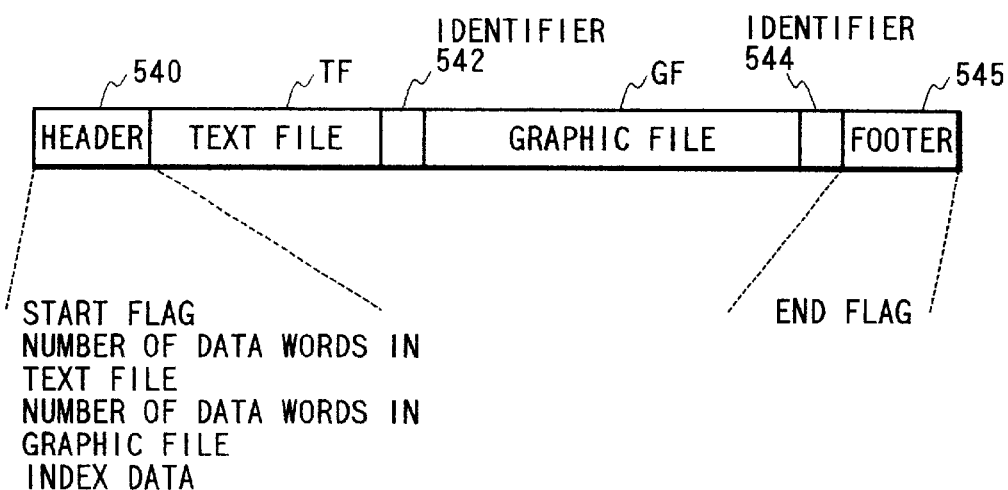
FIG. 4 is an explanatory diagram presenting a transmission format of the composition controlled electronic information at (A) and a storage format of the electronic information of the memory card at (B)
Figure 4B:
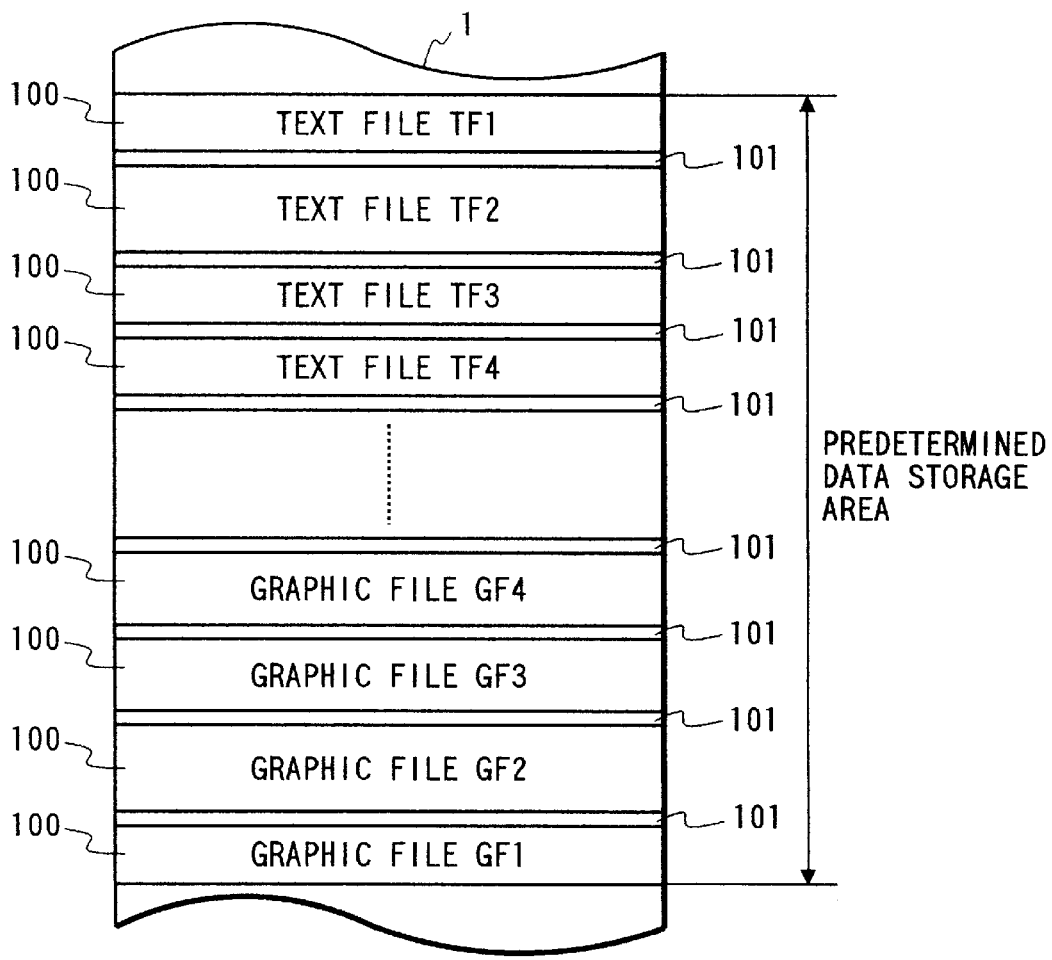

FIG. 4(A) shows the transmission format of the electronic information having its composition controlled, and FIG. 4(B) shows the storage format of the electronic information in the memory card. In this example, one transmission format is composed of a header 540, a text file TF, an identifier 542, a graphic file GF, an identifier 544 and a footer 545. Of these, the header 540, the identifiers 542 and 544 and the footer 545 are given fixed lengths. The header 540 has the start flag, the data word count of the text file, the data word count of the graphic file, and the index data of the graphic file GF and text file TF. The identifier 542 is a code data indicating the last of one text file TF, and the identifier 544 is the code data indicating the last of one graphic file GF. The footer 545 has an end flag indicating the presence or absence of the succeeding information transmission. When a plurality of pairs of text file TF and graphic file GF are contained in a series of information, for example, the end flag in the transmission format of the last pair is enabled. One transmission format is stored with the text file TF and the graphic file GF corresponding to each other. The data of the text file TF and the graphic file GF are transferred in synchronism with the transfer clock by using 32 bytes, for example, as one packet. According to this example, there are assigned to the identifiers 542 and 544 the codes which are inhibited from being used in one packet of a text file TF and a graphic file GF. This transmission format is generated in the composition control unit 54 of FIG. 2.

In the example of FIG. 4, the memory card 1 is different from the file memory which is compatible with the magnetic storage unit, and stores the text file in locations starting with the first addresses of a predetermined data storage area and the graphic file GF in locations starting with the last addresses of the predetermined data storage area. In short, the motion image information and the text information are held in a physically isolated manner in the predetermined data storage area of the memory card 1. According to the example, as shown at (B) in FIG. 4, to the last one of data units 100 for storing text files TF1 to TF4 and graphic files GF1 to GF4, there are coupled data identification units 101, and the end flags of the identifier and the footer 545 contained in the transmission format are stored in the data identification units 101 of the text files TF. The data identification units 101 of the graphic files GF include the identifier 544 and the footer 545 as an end flag, which are contained in the transmission format.

Electronic information of the text file TF received is stored in locations starting with the first address of the predetermined data storage areas in the memory card 1 and the graphic file GF in locations starting with the last address of the predetermined data storage areas in the memory card 1. The last data identification units 101 of the individual files TF and GF are stored with the end flags of the identifiers 542 and 544 and the footer 545. The text file and graphic file having their end flags enabled are the last text file and graphic file transmitted. For reading out the electronic information, the text files TF1 to TF4 are sequentially read from the first address of the predetermined data storage areas. These individual text files TF1 to TF4 are discriminated with the identifier of the data identification unit 101. These reading operations are continued till the enabled end flag is detected from the data identification unit 101. When the enabled end flag is detected in the text file reading operations, then the graphic files GF1 to GF4 are sequentially read from the last address of the predetermined data storage areas, and these reading operations are repeated till the enabled end flag is detected from the data identification unit 101. The individual graphic files are discriminated with the identifier of the data identification unit 101.

Incidentally, the memory card 1 can be exemplified by a file memory compatible with a magnetic storage unit, and the nonvolatile memory has to be equipped with a sector administration table for storing the text information and the motion image information at the sector unit and for holding the correspondence between the sector number and the memory address. In this case, the correspondence between the graphic file and the text file has to be made in terms of the file name (or file number). The transmission format at this time need not always be one for transmitting the text file and the graphic file in pairs, as shown in FIG. 4. For this transmission, the data size or data word count and the file name of a file and the file name have to be contained in the header.

Figure 5:
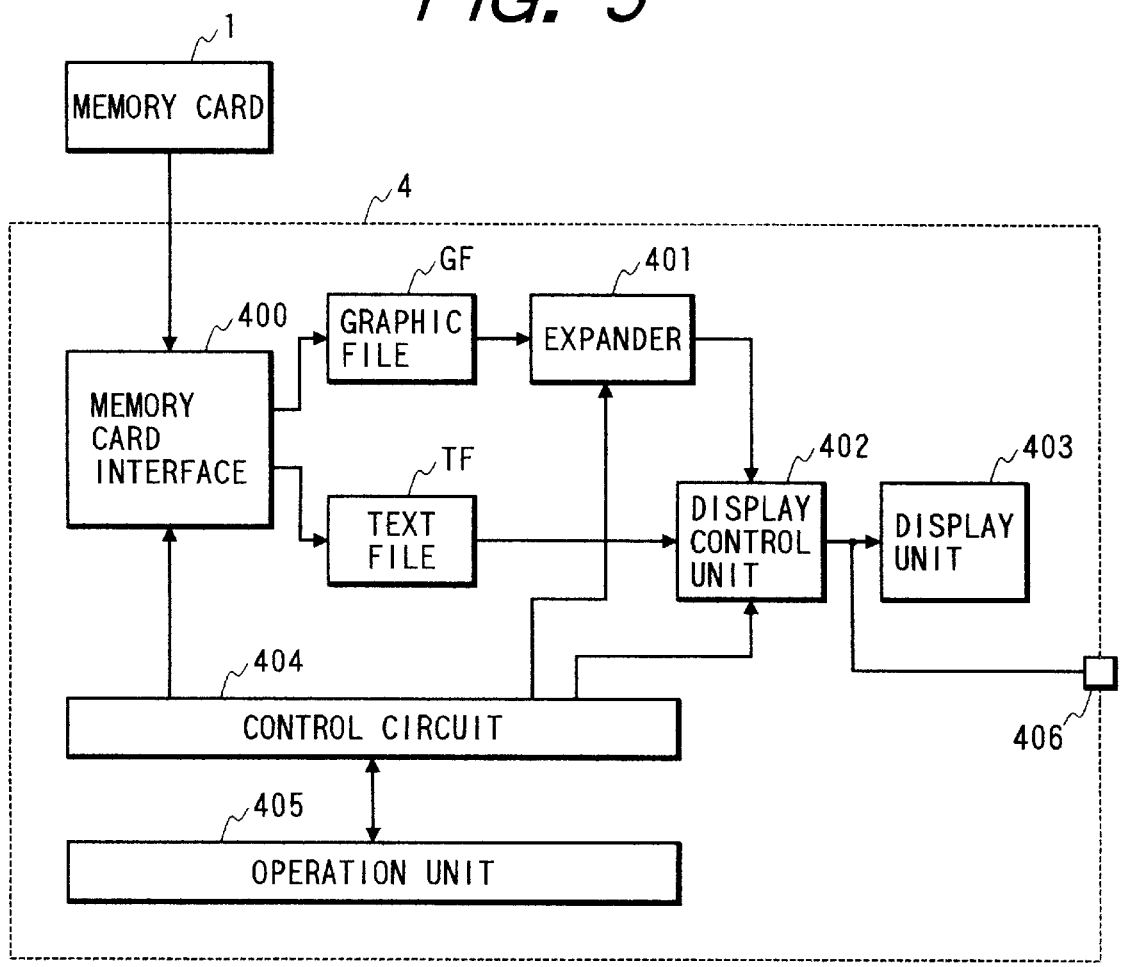
FIG. 5 is a block diagram of one example of the portable display terminal.

FIG. 5 shows one example of the portable display terminal 4. This portable display terminal 4 is equipped with a card interface 400 to which is removably attached the memory card 1. The card interface 400 reads out the text file TF and the graphic file GF from the memory card 1 holding those text and graphic fifes separately, as described with reference to FIG. 4. The graphic file GF, if compressed, is expanded by an expander 401. The motion image information expanded and the text information read out through the card interface 400 are fed to a display control unit 402 so that the corresponding motion image and text information are displayed in a display unit 403. Numeral 404 designates a control circuit for controlling the entirety, and numeral 405 designates an operation unit arranged with various operation buttons. The information to be displayed in the display unit 403 can be outputted through an output terminal to an external recorder 406 such as a VTR.

Figure 6:
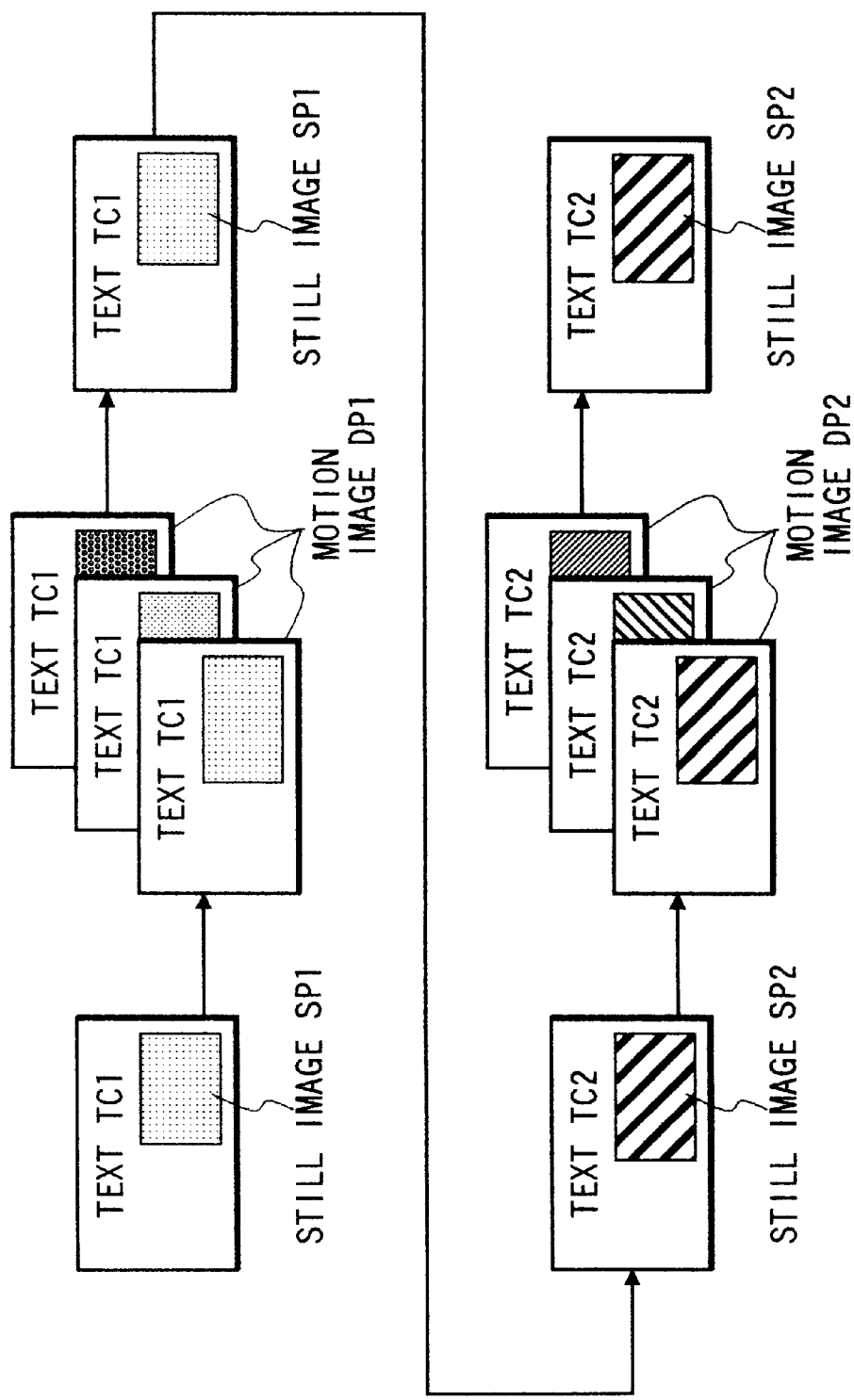
FIG. 6 is an explanatory diagram of one example of the display control mode of the text information and the motion image information in the portable display terminal.

FIG. 6 shows one example of the display control modes of the text information and the motion image information in the portable display terminal. The display control unit 402 causes the text information and the corresponding portion of the motion image information read from the memory card 1 to be displayed as a static image in the display unit 403, so that the static image is reproduced as a motion image on the basis of the instruction coming from the operation unit 405. In FIG. 6, for example, a static image SP1 and a motion image DP1 are obtained from the motion image information pairing the text information (as will be shortly referred to as the "text") TC1, and a static image SP2 and a motion image DP2 are obtained from the motion image information pairing the text TC2. Simultaneously with the display of the text 1, the static image SP1 is displayed in the display unit 403. When the motion image display is then selected in the operation unit 405, the static image SP1 is changed into the motion image DP1 without any change in the text TC1, and the display state of the static image SP1 is restored at the end of a series of motion image displays. When the screen display is then selectively switched to a next news item by the operation unit 405, the static image SP2 as to the text TC2 is displayed, and the static image SP2 is also switched to the motion image DP2 while awaiting the instruction from the operation unit 405 and is returned to the static image SP2 at the end of the motion image display.

Figure 7:
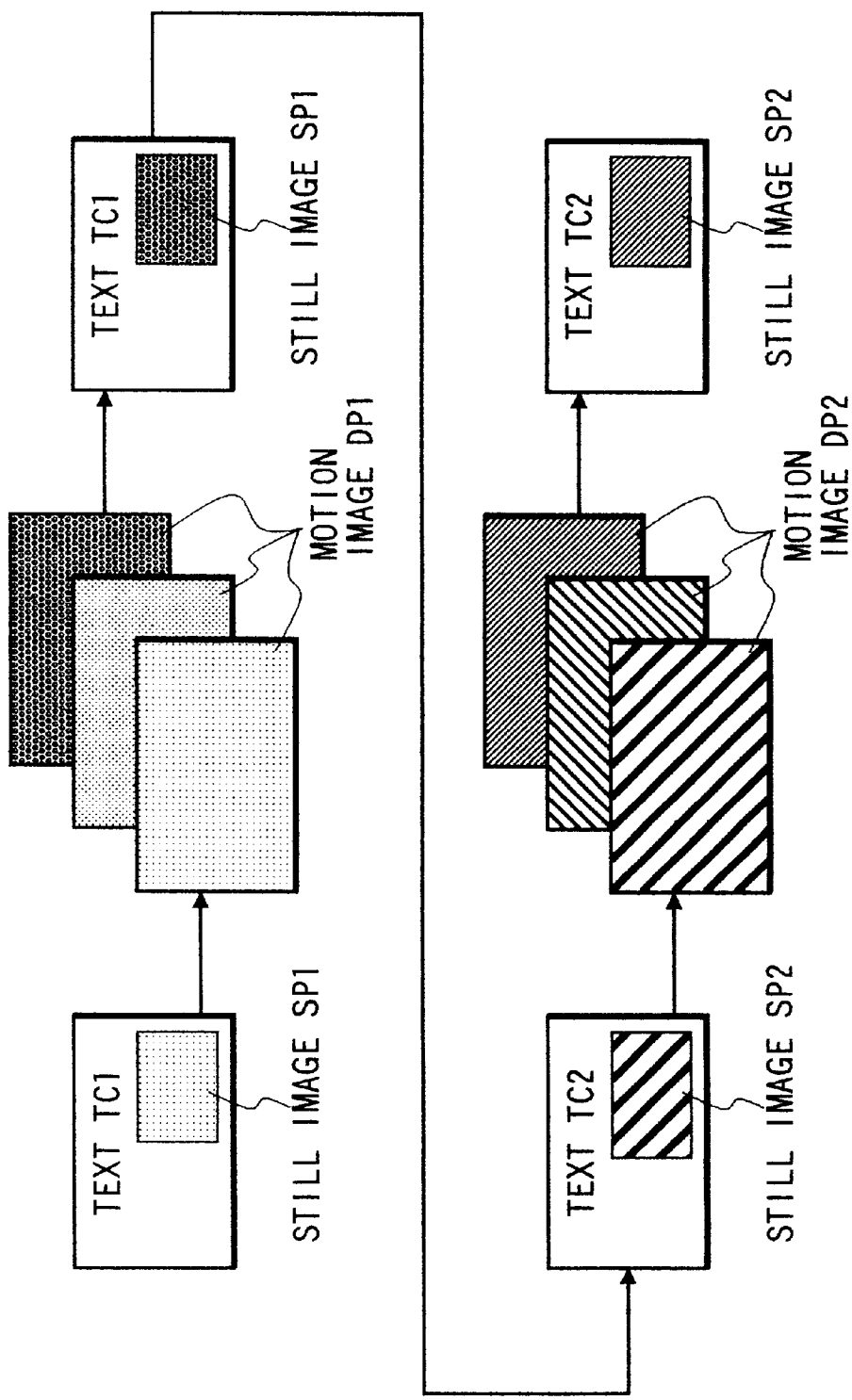
FIG. 7 is an explanatory diagram of another display control mode of the text information and the motion image information in the portable display terminal.

FIG. 7 shows another display control mode of the text information and the motion image information in the portable terminal. In the case of FIG. 7, when a motion image display is instructed by the operation unit 405 with the text TC1 and the static image SP1 being displayed together, the mode comes into the motion image display mode simultaneously as the static image SP1 is enlarged fully to the display screen. At the end of a series of motion images, the image display area is reduced to restore the parallel display state of the text TC1 and the static image SP1. When the screen display is then selectively switched to a next news item by the operation unit 405, the text TC2 and the static image SP2 are displayed together, and the enlargement of the image display area and the switching to the motion image DP2 are effected awaiting the instruction from the operation unit 405 like the above operation. At the end of the motion image display, the static image SP2 is restored.

Figure 8:
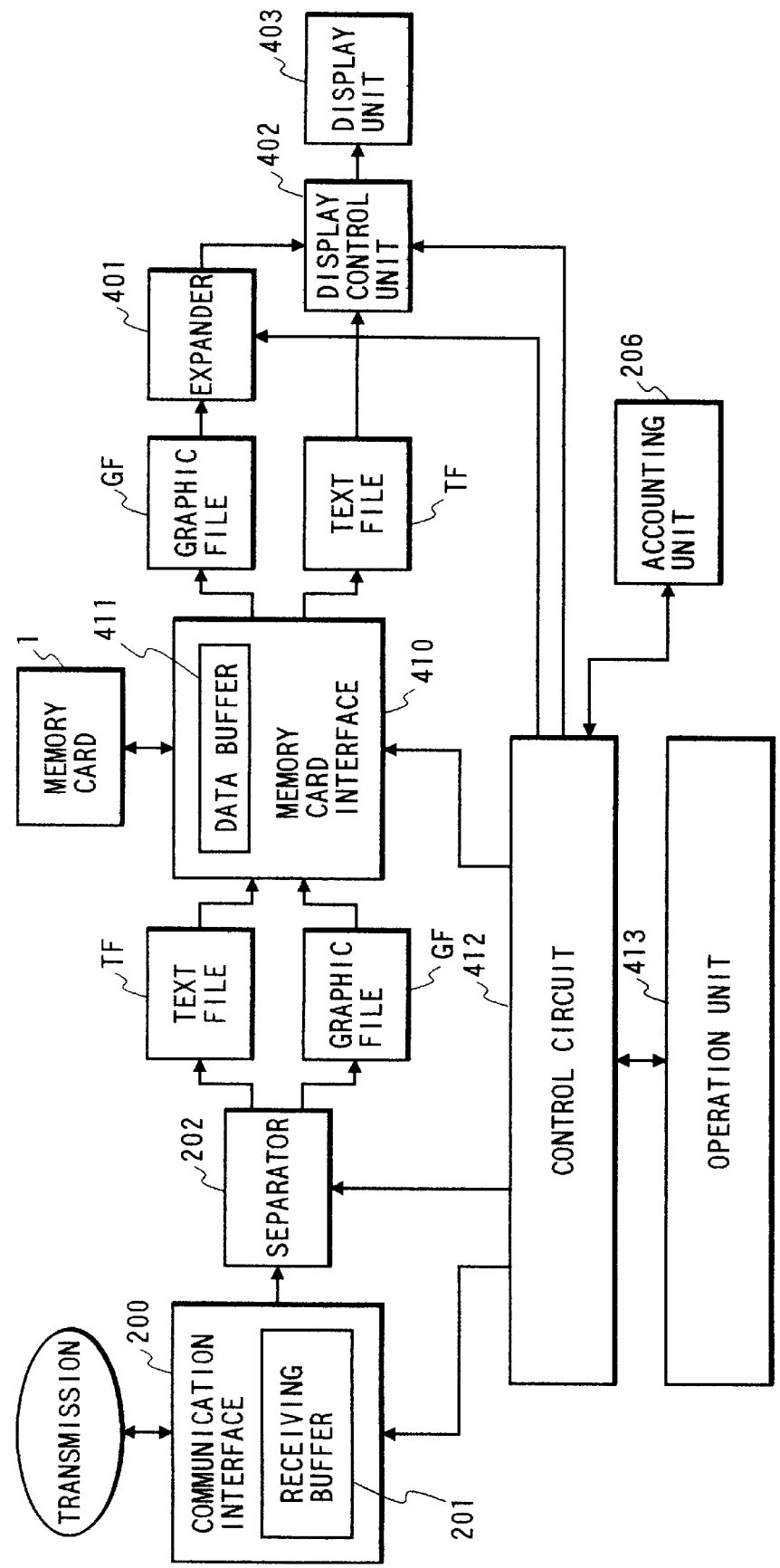
FIG. 8 is a diagram of one example of the portable display terminal which is additionally given the function of the home write terminal.

FIG. 8 is a block diagram showing one example of the portable display terminal functioning also as the home load terminal. The portable display terminal, as shown in FIG. 8, includes the circuit blocks of FIGS. 3 and 5. The memory card interface 410, as shown in FIG. 8, includes a data buffer 411 and serves as the memory card interface 203 of FIG. 3 and the memory card interface 400 of FIG. 5. This data buffer 411 is used to temporarily store a plurality of kinds of electronic information before the memory card 1 is written in case the electronic information is downloaded through the communication interface 200. A control circuit 412 functions as the control circuit 204 of FIG. 3 and the control circuit 404 of FIG. 5. An operation unit 413 functions as the operation unit 205 of FIG. 3 and the operation unit 405 of FIG. 5. The information, transmitted through the transmission line, is received by the communication interface 200 and stored in the receiving buffer 201. The information thus stored in the receiving buffer 201 is separated by the separator 202 into the graphic file GF and the text file TF. The files TF and GF thus separated are once stored in the data buffer 411 and then written in the memory card 1.

The electronic information to be written in the memory card 1 is selected by the operation unit 413. The information selection by the operation unit 413 can be positioned either as the selection of the information to be downloaded or as the selection of the information to be written in the memory card 1. In the former, the control circuit 412 downloads the electronic information of the kind specified by the operation unit 413 through the communication interface 200. In the latter, the control circuit 412 automatically downloads the electronic information of the individual newspaper publishing companies, which are to be serviced by the supply source, through the communication interface during the night in which the message rate may be lower. These electronic newspaper information is separated into the text file TF and the graphic file GF and stored in the data buffer 411. These operations can be executed every time the morning and evening editions are issued. When the user selects a desired newspaper by the operation unit 413, the corresponding electronic newspaper information is written in the memory card 1 through the card interface 410. In the latter type, the individual bills for the electronic newspaper information are issued by the accounting unit 206 when the memory card 1 has stored information from the data buffer 411. Since the portable display terminal of the present embodiment is utilized personally or at home, the billing by the accounting unit 206 is carried out online by the electronic newspaper publisher through the communication interface 200. In case the user receives the distribution of the electronic newspaper, for example, he can input the user identification code and the password from the operation unit 413 to purchase the electronic newspaper information if he is identified as the registered user. Then, the purchasing cost and its detail are returned to the electronic newspaper publisher through the communication interface 200.

One example of the operations for purchasing the electronic newspaper will be described in more detail. In case the distribution of the electronic newspaper information is to be received, the necessary information codes including the user identification code and the password, as registered in advance, are inputted from the operation unit 413. The information thus inputted from the operation unit 413 is transmitted by the control circuit 412 to the transmission line through the communication interface 200. The information thus transmitted through the transmission line is received-by the host system (not-shown) of the distribution source of the information. This host system discriminates the information to be transmitted from the received information and sends the discriminated information through the transmission line. The information thus sent is received by the communication interface 200. The user acknowledges the information by replying to the host system through the communication interface 200 from the operation unit 413. If the wrong newspaper information is received, a resend is demanded to repeat the operations till the right information is received. The received newspaper information is stored in the memory card 1 when the operation unit 413 is given the fact that the desired information has been received. The information thus received through the transmission line is billed by confirming that it has been written in the memory card 1 so that the user may not be billed if the host system transmits unwanted electronic newspaper information.

The display of the electronic newspaper information in the memory card 1 can be similar to the case of the portable display terminal of FIG. 5. The electronic information to be received by the system of FIG. 8 is not limited to the electronic newspaper information.

Figure 9:
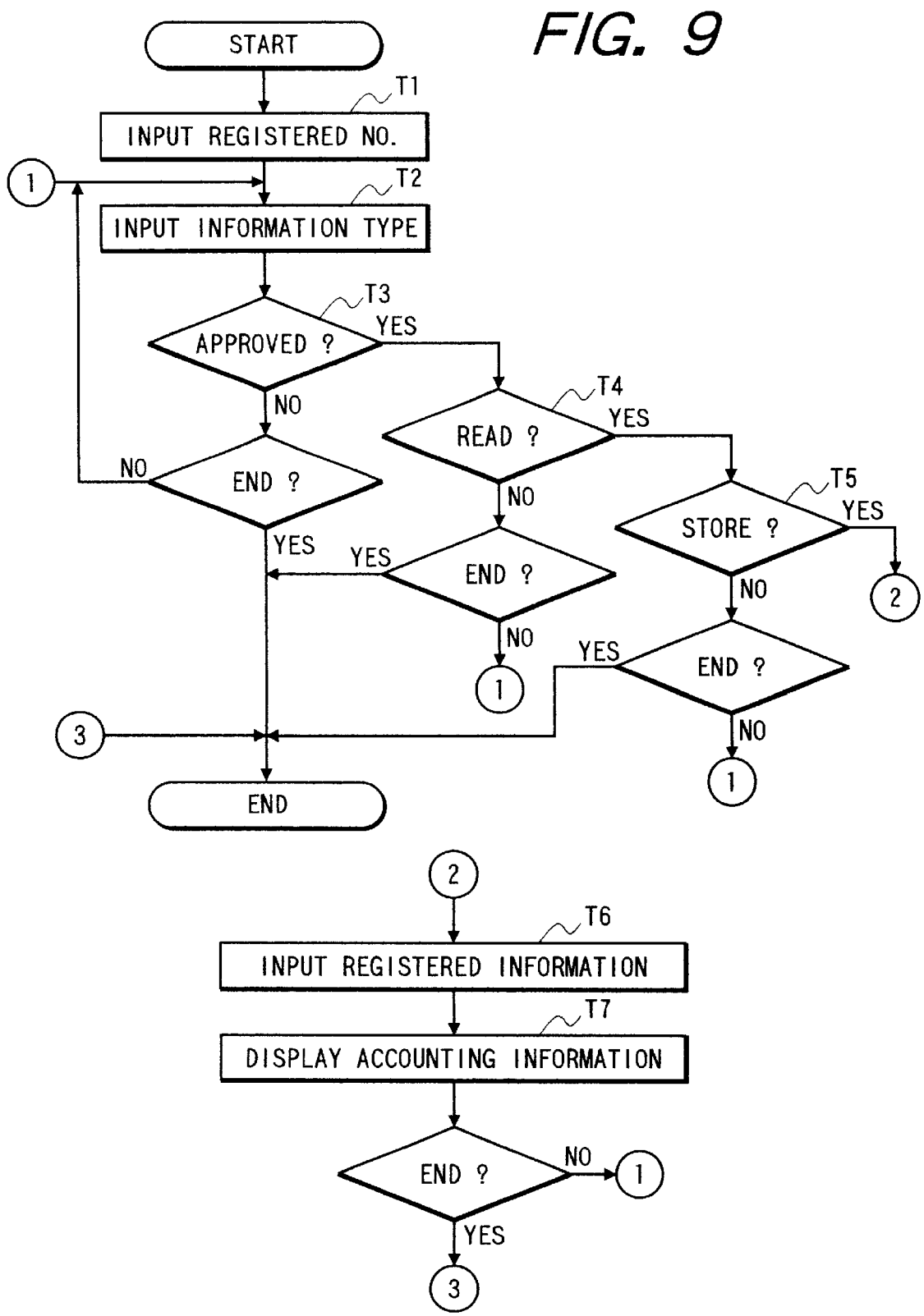
FIG. 9 is a flow chart showing another example of the processing procedure mainly of the billing step when the distribution of the electronic information is received.

FIG. 9 shows another example of the processing routine, especially including billing steps for the distributed electronic information. Upon purchasing the electronic information, the user inputs the registered number such as the user identification code and the password (at Step T1) and the kind of the purchased information from the operation unit (at Step T2). If the input information is not approved at Step T3, the routine can be returned to Step T1 by selecting the continuation of the process. If it is approved at Step T3, the selected information can be read (at Step T4). After this, the instruction to store the read information in the memory card is selected at Step T5 so that the electronic information is stored in the memory card (at Step T6), and the distribution of the electronic information is charged (at Step T7).

Figure 10:
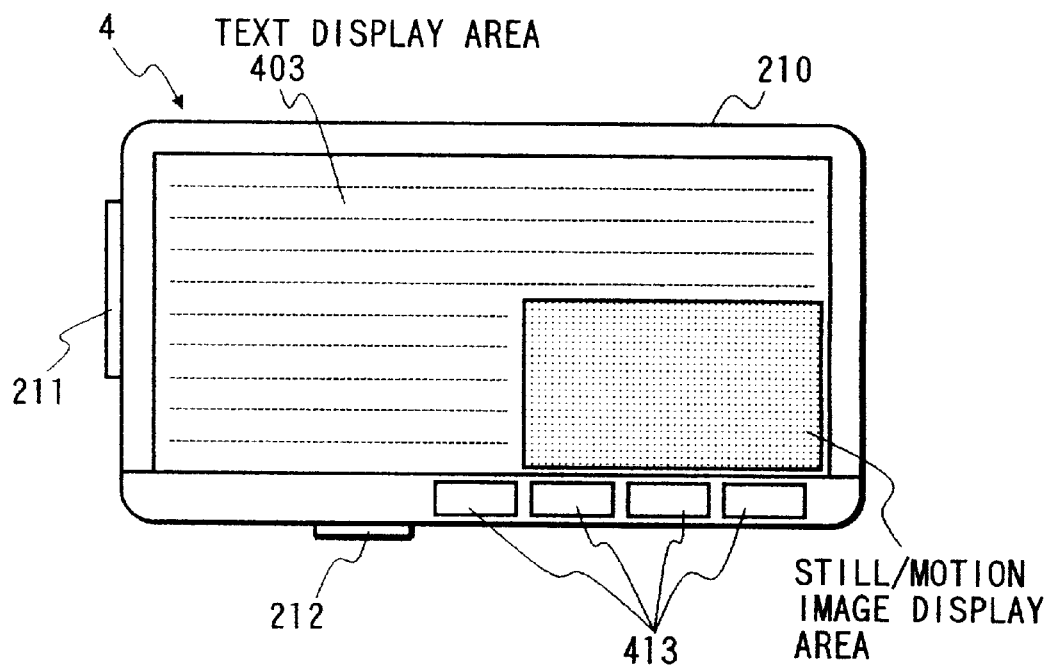
FIG. 10 is a top plan view showing one embodiment of the exterior construction of the portable display terminal described with reference to FIG. 8.

FIG. 10 shows the exterior construction of the portable display terminal 4 described with reference to FIG. 8. Although not especially shown, the portable display terminal 4 of FIG. 5 has a basic exterior construction similar to that of FIG. 10. In FIG. 10, the portable display terminal 4 has the display area of the display unit 403 in the front screen of its casing 210. The display area is used to display the text display area and the static and motion images. The casing 210 is arranged along its edge portion with the operation unit 413 composed of the operation buttons for switching the information of the text display area and the motion/static images, and at its side portions with an interface connector 211 for the communication interface 200 to be connected with the information transmission line and an operation panel connector 212 to which is selectively connected an external operation panel for inputting the character code information such as the user identification code or the password.

Figure 11:
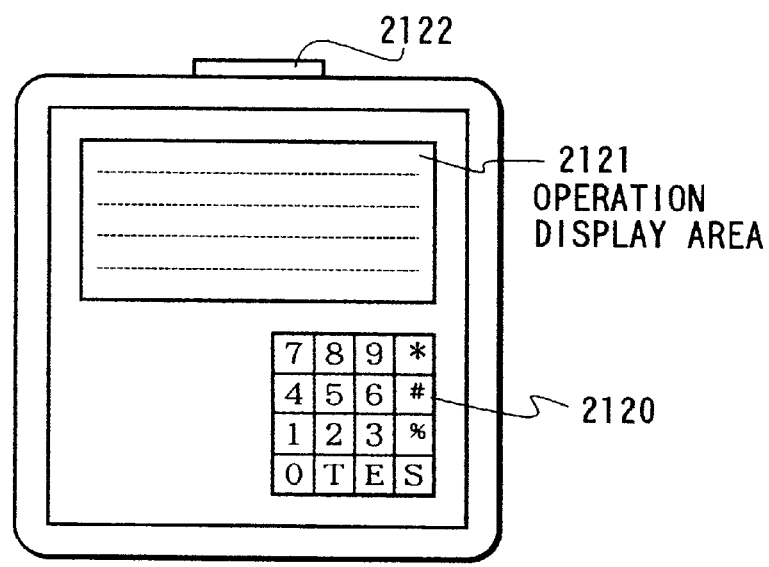
FIG. 11 is a top plan view showing one example of the exterior construction of the operation panel to be connected to the portable display terminal of FIG. 10.

FIG. 11 shows an exterior of the operation panel to be connected to the portable display terminal of FIG. 10. As shown, the operation panel comprises an input keyboard 2120 for inputting the personal identification code; an operation content display area 2121 for displaying the information inputted; and a portable terminal connector 2122 to be connected to the portable display terminal. In case the portable display terminal of FIG. 10 is to be used as the home write terminal, the user has to input the necessary information code and the pre-registered personal identification code. Through the input keyboard 2120, the electronic information selecting code and the personal identification code are inputted with a plurality of figures. The inputted digits are displayed in the operation content display area 2121. If the displayed content is correct, a key "E" is depressed to confirm the input data. After necessary codes or the like have been inputted, a key "T" is depressed to transmit the codes through the communication interface 200 by the control circuit 412 of the portable display terminal 4. Meanwhile, the information, as transmitted from the host system of the distribution source, is received by the portable display terminal 4. The codes for discriminating the received information are displayed in the operation content display area 2121. If the same information as demanded is transmitted, the predetermined electronic information is not stored in the data buffer 411 of the portable display terminal 4 or the memory card 1 before the user depresses a key "S".

Figure 12:
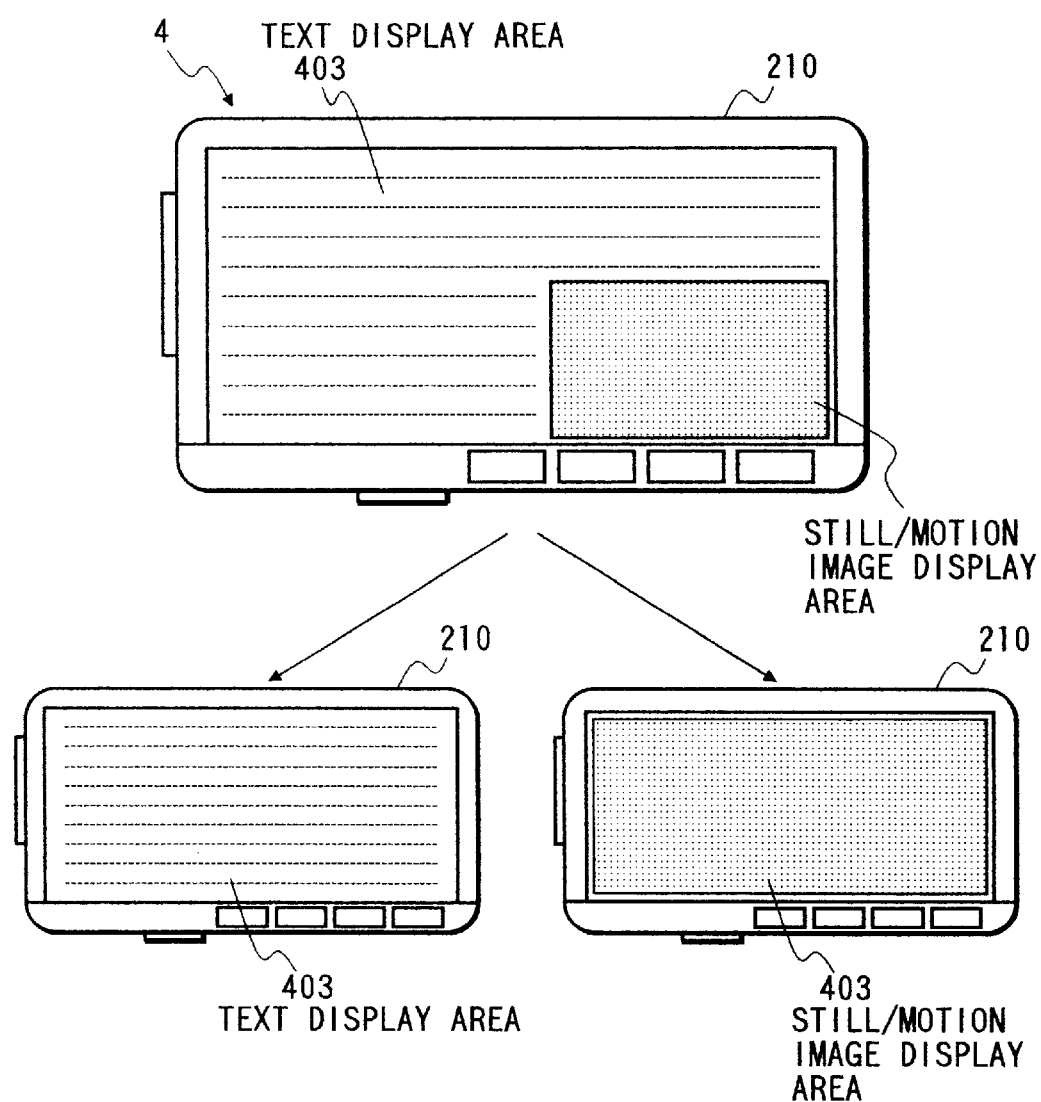
FIG. 12 is an explanatory diagram of the display mode in which the text display area and the static/motion-image display area of the display unit of FIG. 10 are selectively enlarged fully to the display screen.

FIG. 12 shows one example in which the text display area and the static/motion image display area in the display unit 403 of FIG. 10 are selectively enlarged fully to the display screen. Usually, the area for displaying the images is made smaller than the text display area. Depending upon the kind of information, however, there may be considered the case in which it is demanded to display the image in a large scale. In this case, the user is allowed to select the display type freely by the operation unit 413 of the portable display terminal.

Figure 13:
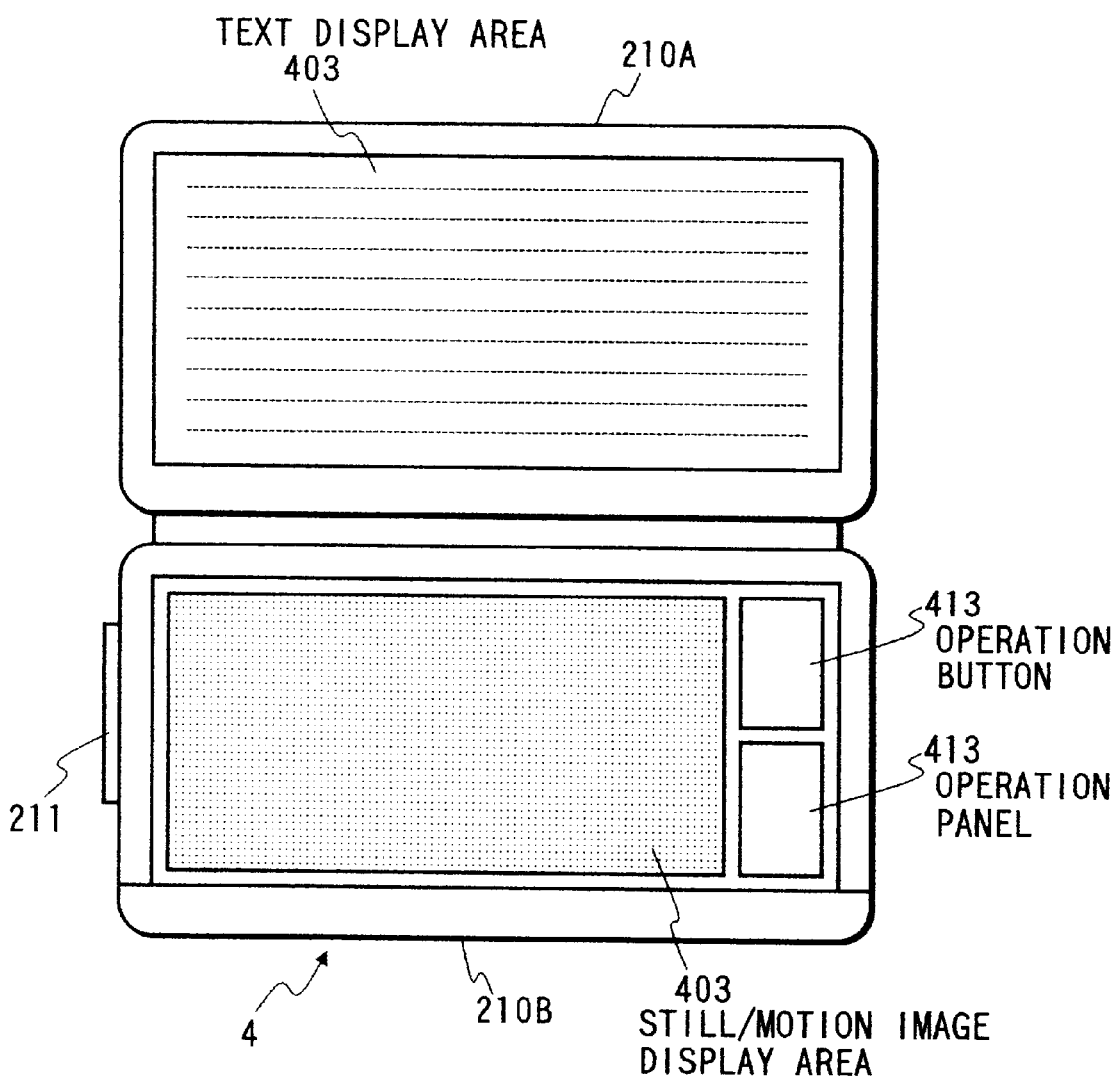
FIG. 13 is a top plan view showing another example of the exterior construction of the portable display terminal.

FIG. 13 shows another exterior construction of the portable display terminal. The example of FIG. 13 is equipped with the display unit 403 in which are physically separated the text display area and the display area for displaying the static image and the motion image. The former display area is disposed in the cover 210A of the casing whereas the latter is disposed in the casing body 210B. This terminal is different from that of FIG. 10 in that the operation unit 413 having the operation panel for inputting the code information is integrated with the body 210B while eliminating the operation panel connector 212. As a result, it is possible not only to realize a better portable display terminal but also to display a larger image without enlarging the image by switching the text display area and the image display area. Moreover, the display area for the static image can be dedicated whereas the motion image can be selectively displayed in the text display area thereby to realize a more impressive image display.

Figure 14:
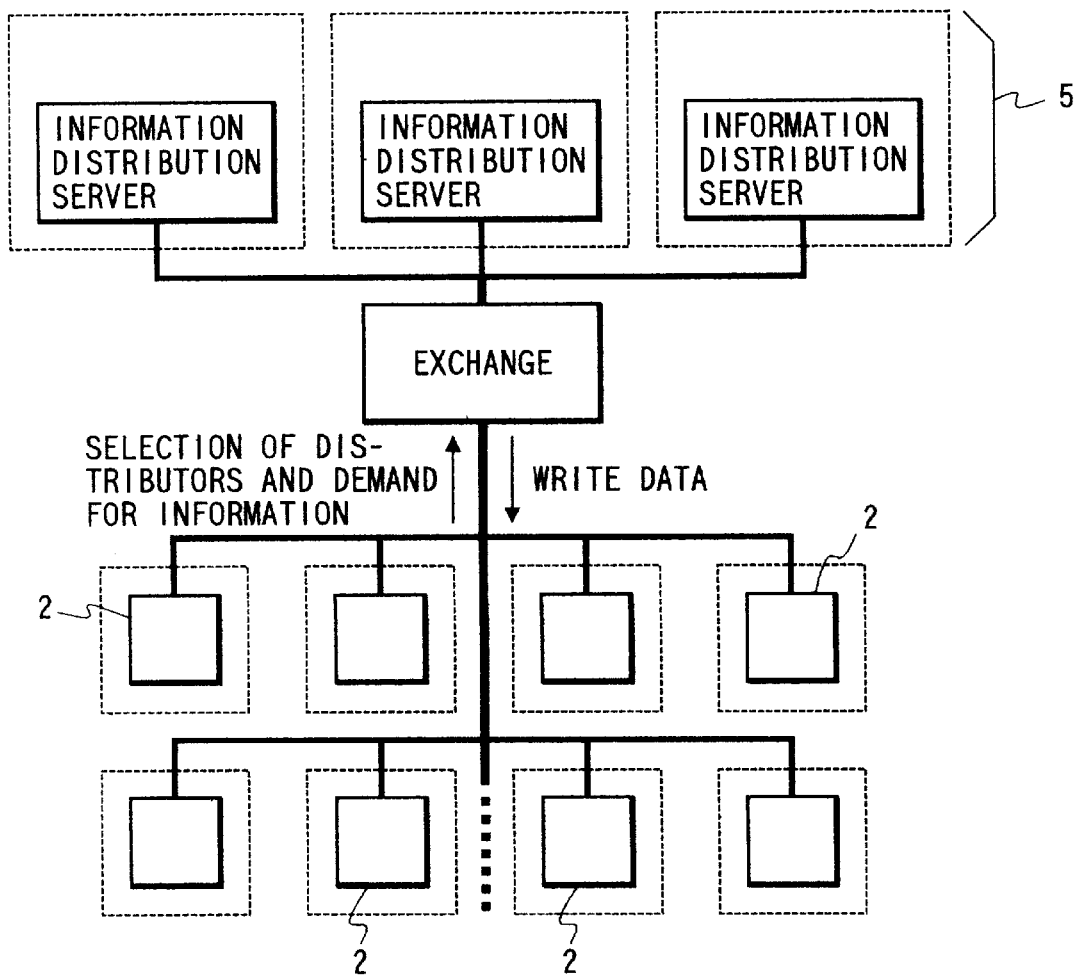
FIG. 14 is a block diagram of one example of the system allowing a wide variety of users to write the memory card used in the portable information terminal with the desired electronic information.

FIG. 14 shows an example of the system construction which allows the user to write desired information into the memory card used in the portable information terminal 4. The numerous write terminals 2 are connected through the communication lines (e.g., the ISDN lines, the CATV cables or the wireless lines) with the information distribution sources 5 including the newspaper publishing companies, the magazine publishing companies, the broadcasting stations and the self-governing communities so that data to be written in memory cards are sent to the individual write terminal 2 in accordance with the distribution source selection and the information demand signal from the write terminal 2. Alternatively as to the mass media information of the newspapers or magazines, the same data may be simultaneously sent to the numerous write terminals 2 at a predetermined time. The write terminals 2 may be constructed to be suitably installed at the lobbies of stations, halls or hotels or at schools for the concentrated utilizations of many people, to be suitably installed at convenience stores, private concerns or gas stations for the suitable utilizations of many people, and to be installed at home or in the guest rooms of hotels for personal utilizations. The former two installations can be positioned as the aforementioned dedicated load terminal 2A whereas the latter can be positioned as the aforementioned home write terminal 2B.

Figure 15:
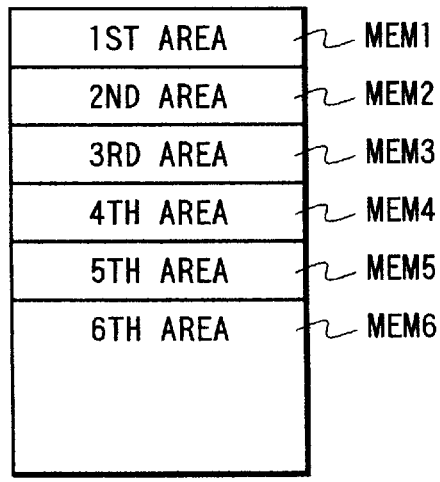
FIG. 15 is an explanatory diagram showing one example of the memory card using mode in case the electronic information for the portable display terminal is provided by the prepaid method.

FIG. 15 shows one example of the mode of using the memory card 1 in case the electronic information for the portable display terminal 4 is provided by the prepaid system. The memory card has six data storage areas: a first area MEM1 to a sixth area MEM6. The individual areas have their memory addresses fixed such that the storage capacities of the first area MEM1 to the fifth area MEM5 are no more than one tenth of that of the sixth area MEM6. Either the sixth area MEM6 or the fifth area MEM5 and the sixth area MEM6 may be constructed of a nonvolatile memory of a kind different from that of the remaining areas. Relatively speaking, the fifth and sixth areas MEM5 and MEM6 are required to be inexpensive and large in capacity whereas the first area MEM1 to the fourth area MEM4 need higher speed and complete nonvolatility.

The first area MEM1 can be rewritable only by the memory card manufacturer and it contains specification data such as the storage capacity of the memory card. If this first area MEM1 stores the guaranteed number of rewrite operations, the system can be operated accordingly. The second area MEM2 can be erased, written and read only by the write terminal which is administered by the information vendor, and it may contain data such as the password number and the available number of write operations set by the information vendor. The password number is utilized to inhibit the user to write and erase the third area MEM3. This third area MEM3 can be erased and written only by the write terminal which is administered by the information vendor, while the user can only read, and it contains such information as the available number of rewrite operations, the information name designation, the kind and number of the write terminals, and the time of information writing. The fourth area MEM4 can be erased and written by the user, and it contains the data such as the password of the user. The fifth area MEM5 contains the index data (e.g., the provided information name and the data amount) of the provided information. The sixth area MEM6 contains the provided information such as text information and motion image information (including voice information) separately. This sixth storage area constitutes a predetermined data storage area, as shown in FIG. 4(B). Incidentally, depending upon the transmission format of the electronic information and the kind of the data, the fifth area can contain the kind and mode of data, i.e., whether compressed/uncompressed, the kind of the text/image/motion-image/voice, and the leading address of the data of each kind.

Figure 16:
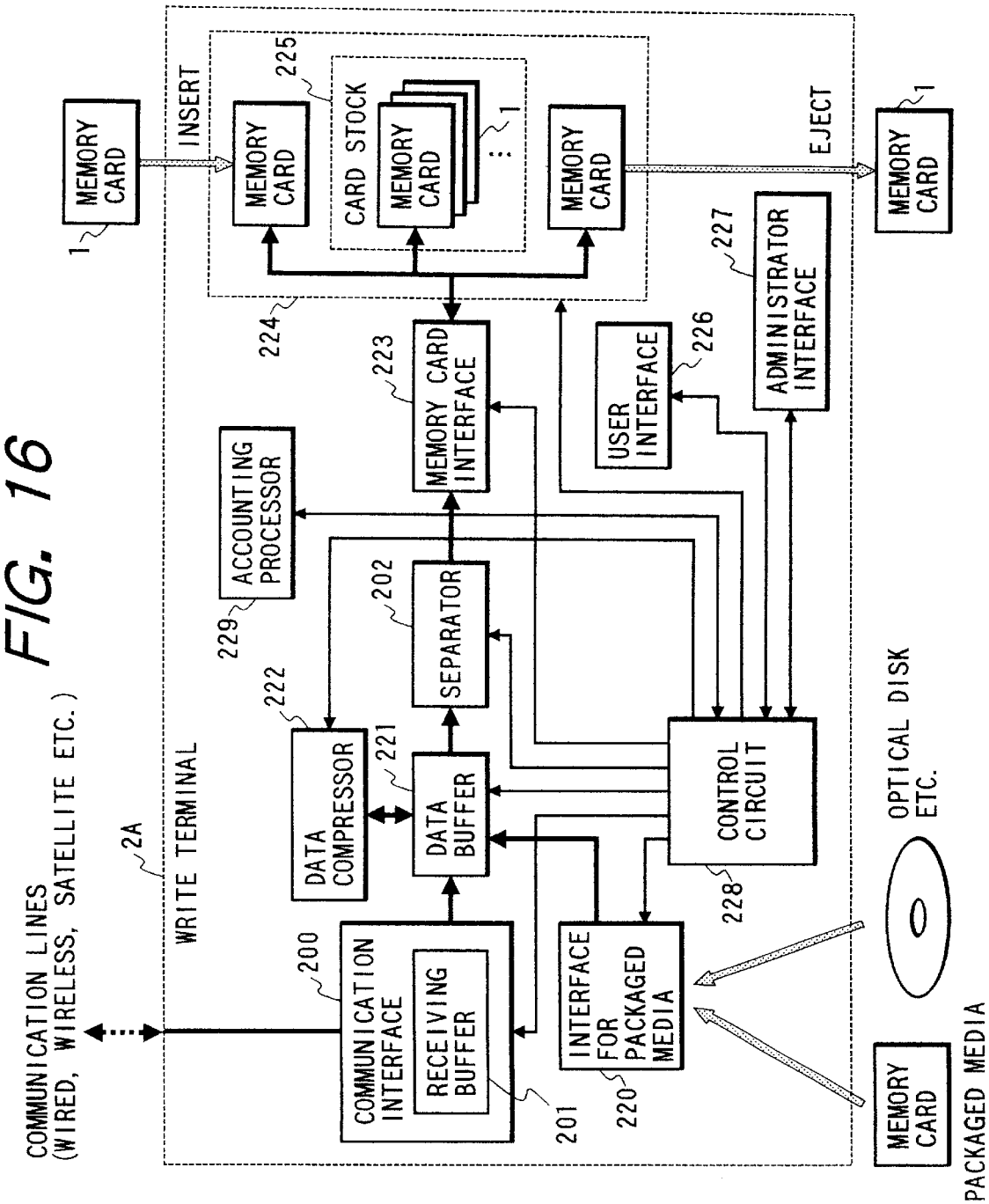
FIG. 16 is a block diagram of one example of the load terminal which can be concentratedly utilized by many persons and can rewrite many memory cards in a short time period.

FIG. 16 shows a write terminal 2A which can be utilized by many persons in a short period of time to write a number of memory cards. The write terminal 2A, as shown in FIG. 16, is an electronic information distributing terminal for writing the electronic information including the text information and the corresponding motion image information into the memory card 1, which has an electrically rewritable nonvolatile semiconductor memory, and for distributing the electronic information. This terminal is equipped with the communication interface for interfacing the communication line, and a package media interface 220 for taking the data from a package medium such as an optical disk. The communication interface 200 has the receiving buffer 201. The electronic information, fed from the communication interface 200 or the package media interface 220, is temporarily stored in a data buffer 221. This data buffer 221 is constructed of a semiconductor memory of large capacity or a magnetic storage device. A data compressor 222 is coupled to the data buffer 221 so that uncompressed electronic information (e.g., the information taken by a digital camera) fed from the package media interface 220 can be compressed and stored in the buffer memory 221. The electronic information thus stored in the data buffer 221 is divided by the separator 202 into the text information and the motion image information. The text information is formatted into a text file whereas the motion image information is formatted into a graphic file so that they are stored in the memory card 1 through a memory card interface 223. The memory card interface 223 can simultaneously accept a plurality of memory cards 1 so that it can read, erase and write the data in parallel. The write terminal 2A of the present embodiment can distribute the electronic information like the automatic vendor to vend only the electronic information when stored in the memory card 1, and the memory card 1 together with the electronic information. A card machine 224 for receiving memory cards 1 and ejecting written cards has a card stock 225. The terminal is further equipped with a user interface 226 including a user operation panel for the user to purchase the electronic information, and an administrator interface 227 including an administrator operation panel for the administrator to administrate the write terminal. The use interface 226 and the administrator interface 227 constitute an operation unit together. An accounting processor 229 for collecting the charge for distributing the electronic information and processes the collection of money or the change in the balance in prepaid cards. A control circuit 228 controls the entirety of the write terminal 2A in accordance with the preset programs. Incidentally, the data compressor 222 can be dispensed with in case the electronic information to be fed from the electronic information source to the communication interface 200 and the package media interface 220 are limited to the compressed data.

Figure 17:
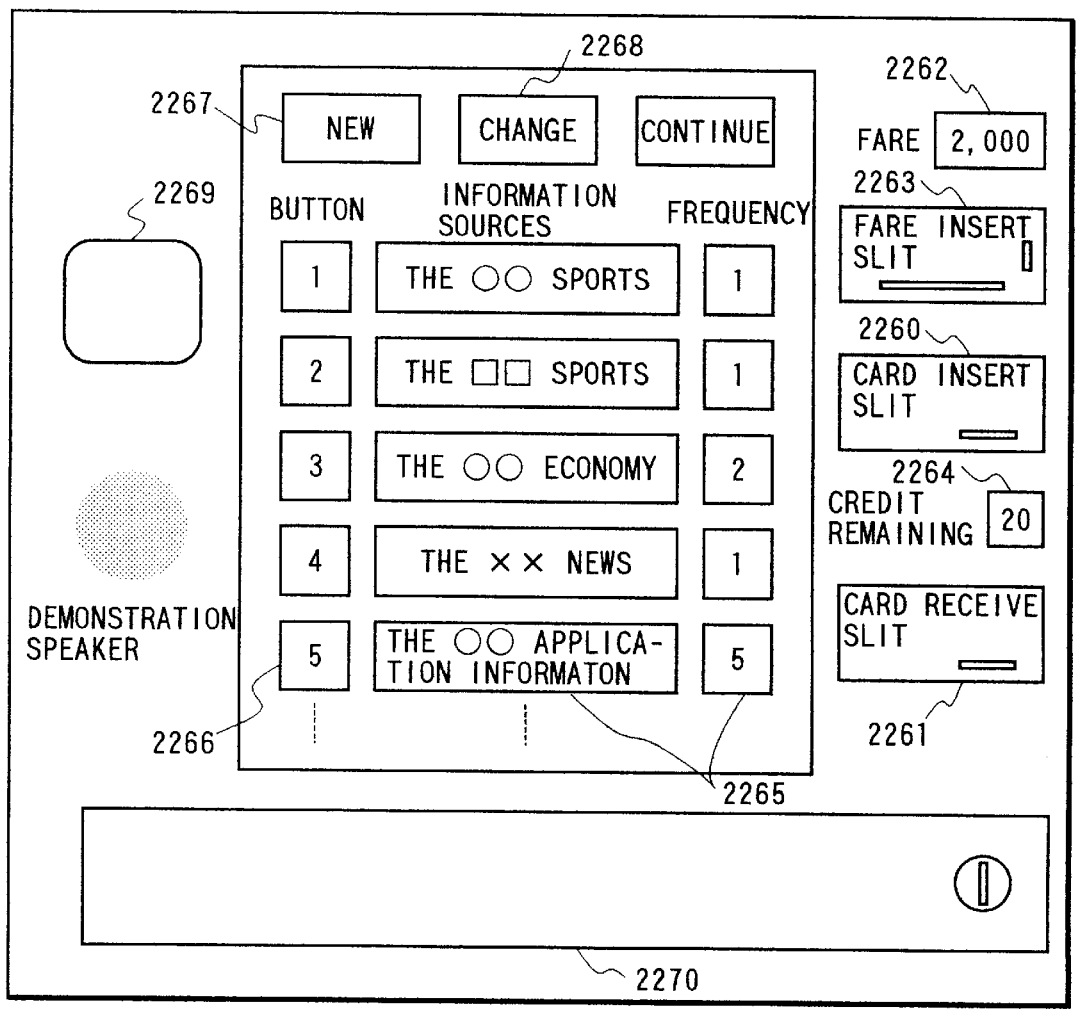
FIG. 17 is an explanatory diagram of one example of the user's operation panel contained in the user interface and belonging to the write terminal of FIG. 16.

FIG. 17 shows one example of the user's operation panel included in the user interface 226. This write terminal 2A is of the type, in which it is concentratedly utilized by many persons, and the user's operation panel is arranged in front of the write terminal. This user's operation panel includes a card slot 2260; a card return 2261; a fare indicator 2262; a fare insert and change return slot 2263; a message unit indicator 2264 for indicating the balance in the prepaid memory cards; an indicator 2265 for indicating the name of available information and the number of message units required for the sales; a button 2266 for selecting the name of information to be purchased; a button 2267 for instructing to purchase a new memory card; a button 2268 for designating whether the name of information to be purchased is left as the previous one or changed (that is, the previous name is retained with no designation to select the continuation); and a demonstration screen 2269 for demonstrating the distribution time of the information, the edition and a portion of the content of the information. The administrator's operation panel of the write terminal 2A has its surface covered with a keyed cover 2270, in which are arranged buttons or a keyboard and a display for the administrator to perform the various operations and settings, the insert/receive slots for the packaged media'and the memory card insert/receive slots. These memory card insert/receive slots of the administrator's operation panel are provided for inserting the memory card to be initially stocked or for receiving the expired memory card. These card insert/receive slots can also be used as the user's memory card insert/receive slots. On the other hand, the administrator's operation panel may be arranged at the back of the user's operation panel.

Figure 18:
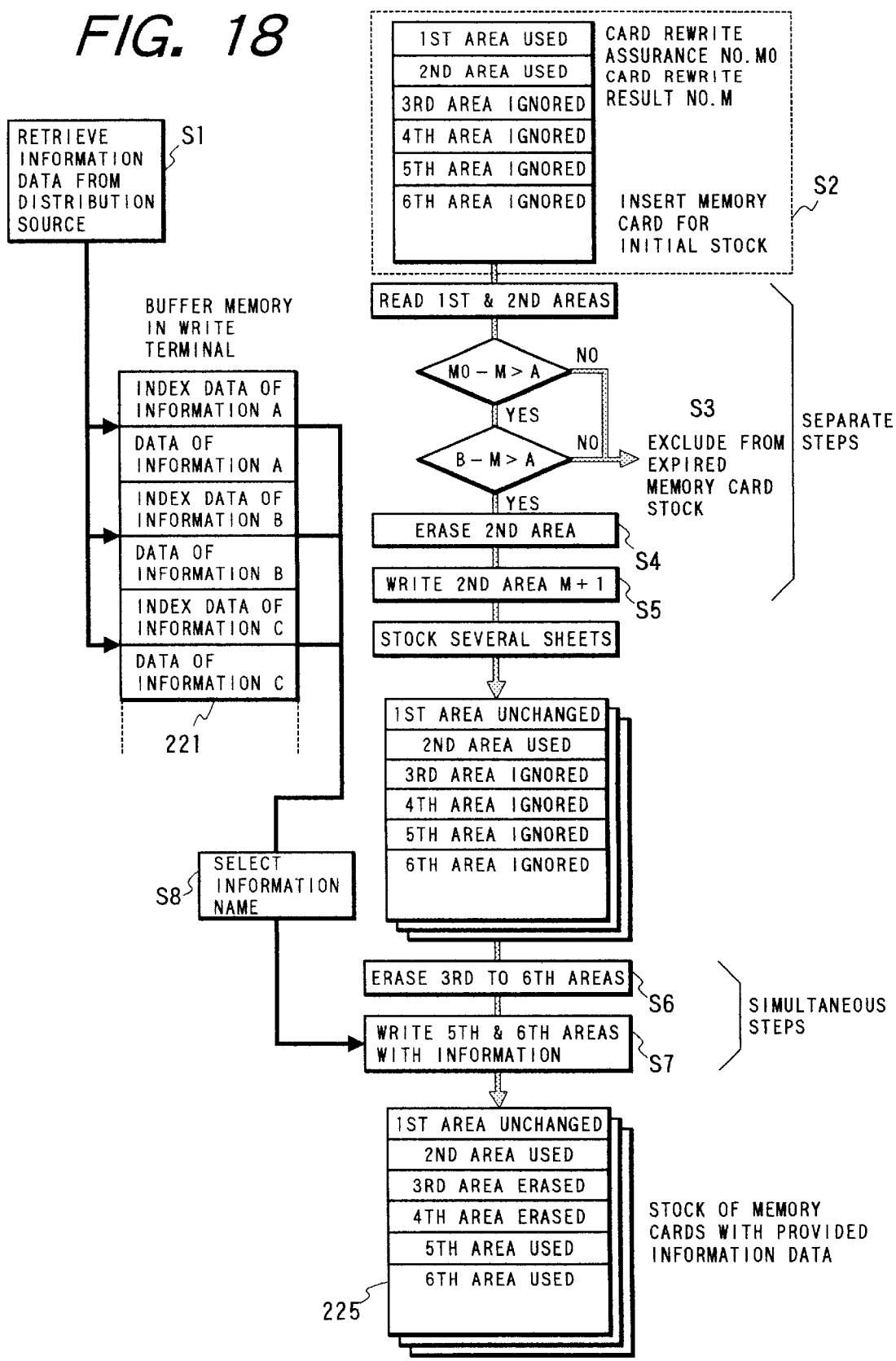
FIG. 18 is a flow chart showing an initialization preparing procedure for stocking the written memory cards in the card stock of the write terminal of FIG. 16.
Figure 19:
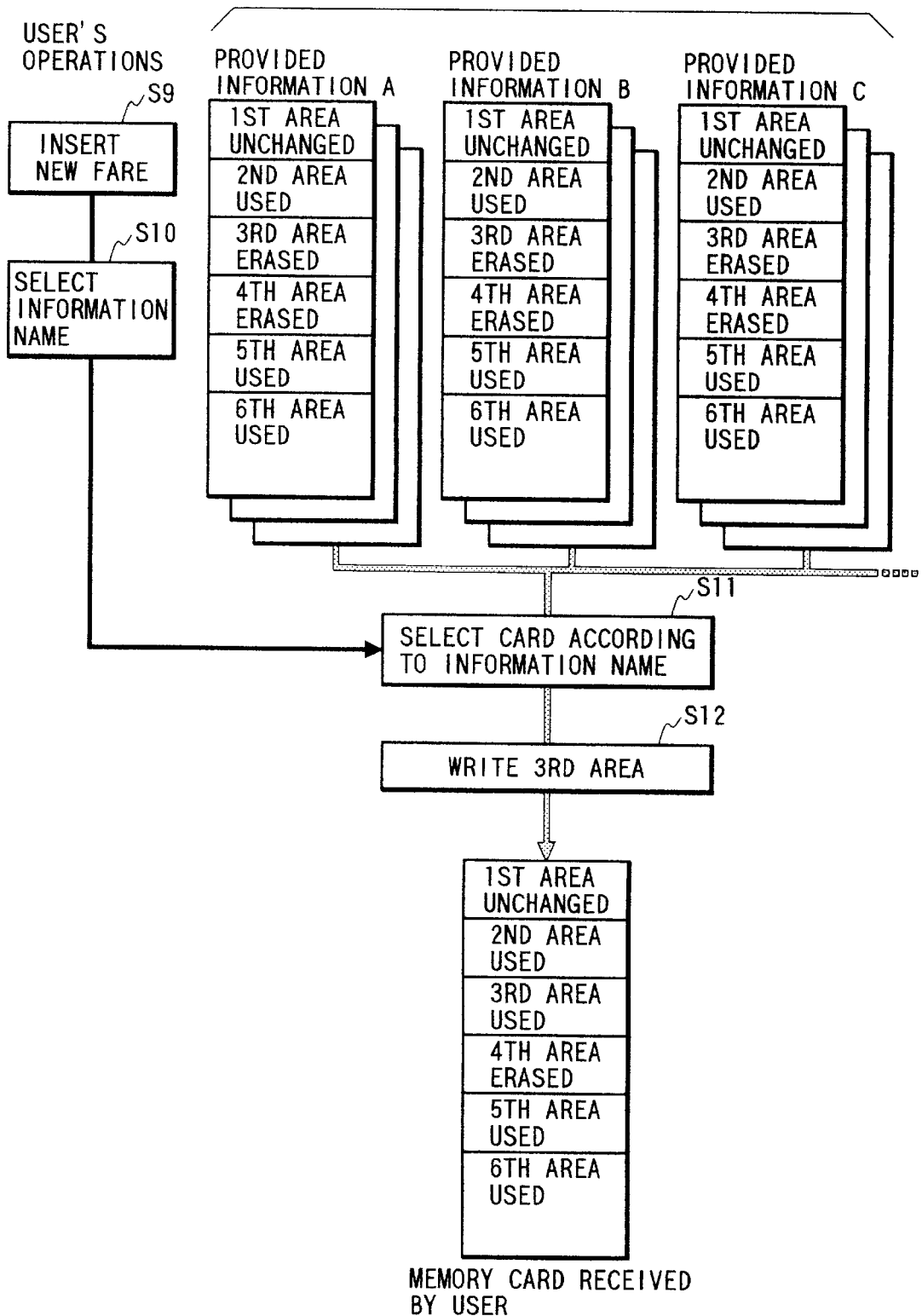
FIG. 19 is a flow chart showing the procedure for providing the user who has purchased a new memory card with the information in the write terminal of FIG. 16.
Figure 20:
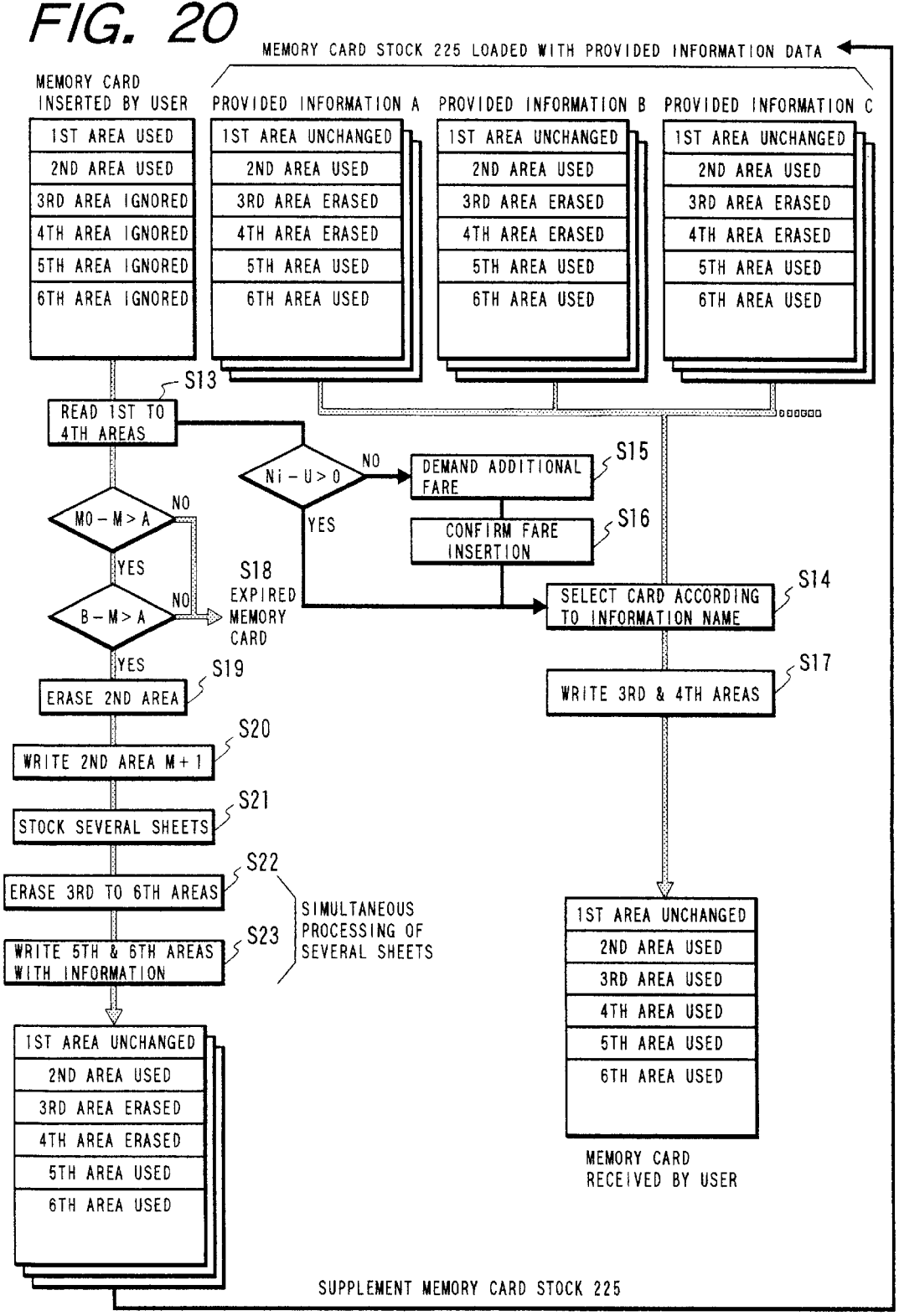
FIG. 20 is a flow chart showing the procedure for providing the user owning the memory card in the write terminal of FIG. 16 with the information and the procedure for reusing the inserted memory card owned by the user.

In the write terminal 2A described with reference to FIGS. 16 and 17, the electronic information, supplied from the information distributor through the communication line or the package media, is stored in the data buffer 221 or in a plurality of memory cards so that they are stored in the card stock 225. Specifically, electronic information is written in a plurality of memory cards 1 in parallel, and a plurality of memory cards holding the supplied information of the individual names are stored as the card stock 225. For either a demand for distributing only the electronic information or a demand for distributing the electronic information accompanied by a new purchasing of the memory card 1, moreover, the electronic information is distributed by discharging the memory card 1 of the card stock 225. In the demand for distributing only the electronic information, the user inserts his memory card 1, which is added to the card stock 225 so that it is later used for vending the information. As a result, the desired information can be promptly provided without any time period for loading the individual memory cards with the electronic information. Moreover, the aforementioned memory card 1 has the area (MEM1) for recording the information indicating the limit of rewriting the electronic information for the memory card and the area (MEM2) for recording the actual number of rewrite operations. If the actual number exceeds a given limit, the card is removed from the card stock; otherwise it may be used to rewrite new information until the given number is reached. As a result, the expired memory card can be recovered and exchanged without bothering users so that the undesired expiration of the memory card 1 can be prevented to improve the reliability of the sales of the electronic information. FIGS. 18 to 20 show examples of the electronic information distributing procedure for achieving such effects and the procedure of loading the memory card 1 with the information.

FIG. 18 shows an initial preparation procedure for storing the loaded memory cards in the card stock 225. First of all, by the administrator's operation of the write terminal 2A or according to the programs set in the write terminal 2A, the information data, as provided by the information distributor, are stored in the data buffer 221 of the write terminal 2A through the communication line or the package media (at Step S1). The electronic information and their index data are stored in the data buffer.

For the initial stocking of the card stock 225, a plurality of memory cards 1 are inserted into the card machine system 224 of the write terminal 2A (at Step S2). The memory cards 1, as used herein, are divided into the first area MEM1 to the sixth area MEM5, as described with reference to FIG. 15. The first area MEM1 stores the guaranteed number of rewrite operations MO, and the second area stores the actual number of rewrite operations M.

For the initial stock memory card 1 inserted, the data are read out from the first area MEM1 and the second area MEM2. The memory card 1 is excluded as an expired one from an object to be stocked in the memory card stock 225 (at Step S3) if MO−M≦A for the guaranteed number MO of the first area MEM1, the actual number M of the second area MEM2 and a preset value A (e.g., a constant at 100 such as a safety factor arbitrarily set for assuring the reload), or if B−M≦A for the limit B set by considering the lifetime of the memory card exchange.

For the memory card other than the expired one, the data of the second area MEM2 are deleted (at Step S4), and the password No. of the sales administrator set in the write terminal 2A and the card actual number of rewrite operations is updated to M+1 and written (at Step S5). Thus, a plurality of memory cards to be actually utilized are stocked in the memory stock 225.

Next, the data of the third area MEM3 to the sixth area MEM6 of each memory card are deleted (at Step S6), and information is stored in the fifth and sixth areas MEM5 and MEM6 (at Step S7). The erasure and writing at Steps S6 and S7 are executed in parallel for a plurality of (e.g., 10 to 50) memory cards 1 in accordance with the abilities of the card machine system 224 and the memory card interface 223. The selection of the information name (at Step S8) at this time can be individually executed either automatically according to the programs of the control circuit 228 or by the administrator using the administrator's operation panel. Thus, a number of memory cards 1 holding the provided information data are obtained in the card stock 225. The numbers in the card stock 225 for the Individual information can be individually determined to 50 for the information A, 20 for the information B and 10 for the information C either by the administrator's operation of the load terminal or according to the programs set in the write terminal 2A.

FIG. 19 shows a procedure for providing a new memory card purchasing user with the information. In case (at Step S9) the new button 2267 is depressed by the user's operation to insert a new fare, one memory card 1 is selected (at Step S11) from the memory card stock 225 of each information name in accordance with the selected information name (at Step S10). The selected memory card 1 has its third area MEM3 (at Step S12) with the data such as the available number of rewrite operations NO-U, an information name specifying information or the time and is given to the user. The NO indicates the available number of rewrite operations corresponding to the selling price of the memory card, and the U indicates the number of rewrite operations depending on the price of the designated information (i.e., for the desired information).

FIG. 20 shows the procedures of providing the memory card owner with the information and reusing the inserted memory card 1. The data, in the first area MEM1 to the fourth area MEM4 of the user's memory card 1 inserted into the write terminal 2A, are read out (at Step S13). One memory card 1 is selected (at Step S14) from the memory card stock 225 for each information name in accordance with the information name designating information stored in the third area MEM3, if the actual number of rewrite operations Ni stored in the third area MEM3 is no less than the desired number of rewrite operations U. If the available number Ni is smaller than the desired number U, a demand for an additional fare is displayed (at Step S15). If the insertion of the additional fare is confirmed (at Step S16), one memory card 1 is also selected (at Step S14) from the memory card stock 225 of each information name in accordance with the information name designating information of the third area MEM3. The memory card 1 selected at S14 has its third area MEM3 holding the available number of rewrite operations Ni-U. If the fare is additionally inserted, the available number of rewrite operations Ni+add-U is recorded while considering a frequency corresponding to the additionally inserted fare. Moreover, the third storage area MEM3 of the memory card 1 holds the data such as the information name designating information or the time. The data read out from the fourth area MEM4 of the inserted user's memory card 1 are transferred (at Step S17) to the fourth area MEM4 of the memory card 1. The user is provided with the resultant memory card. These procedures help to provide users with their desired information in a very short time because it is not written each time a user inserts a card.

For the user to reuse the inserted memory card, the controls are made by the following procedure. The user's memory card, as inserted into the load terminal 2A, is excluded as the expired one from the object for the reuse (at Step S18) either if it is decided that MO−M≦A on the basis of the guaranteed number of rewrite operations MO read out from the first area MEM1 of the memory card, and the actual number of rewrite operations M read out from the second area MEM2 of the same, and the preset value A (e.g., 100) or if it is decided that B−M≦A for the limit B set independently of the MO. For the unexpired memory card 1, the second area MEM2 is erased (at Step S19), and the password number of the sales administrator, as set in the write terminal 2A, and the actual number of rewrite operations is updated to M+1 and written (at Step S20). Thus, the memory cards 1 to be reused are stocked (at Step S21).

Next, the data of the third area MEM3 to the sixth area MEM6 of the individual memory cards, as stocked to be reused, are deleted (at Step S22), and information is written in the fifth and sixth areas MEM5 and MEM6 (at Step 23). The kind of information to be written can be automatically determined according to the sales results of the provided information. For example, in case the erasure and writing in Steps S22 and S23 are executed in parallel for a plurality of, e.g., about ten memory cards 1 in accordance with the abilities of the card machine system 224 and the memory card interface 223, the erasure and writing in Steps S22 and S23 can be effected when the sales result card number for each information name reaches a parallel processing number. The selection of the information name at this time can be executed either automatically according to the program of the control circuit 228 or individually by the administrator using the administrator's operation panel. In short, the number of memory cards 1 to be simultaneously handled to write the information name can be determined according to the difference between the set stock number of each information name and the stock number at that time and in accordance with the program set in the write terminal 2A. Thus, the card stock 225 of the memory card 1 holding the provided information is grown.

Moreover, in case the information data from the information distributor are changed with the same information name, the data in the data buffer 221 of the write terminal 2A are rewritten, and the stock 225 of the memory cards 1 holding the provided information data of the same information name is repeatedly subjected to the procedure similar to that of Steps S18 to S23 so that the user can always be provided with the latest information data.

Figure 21:
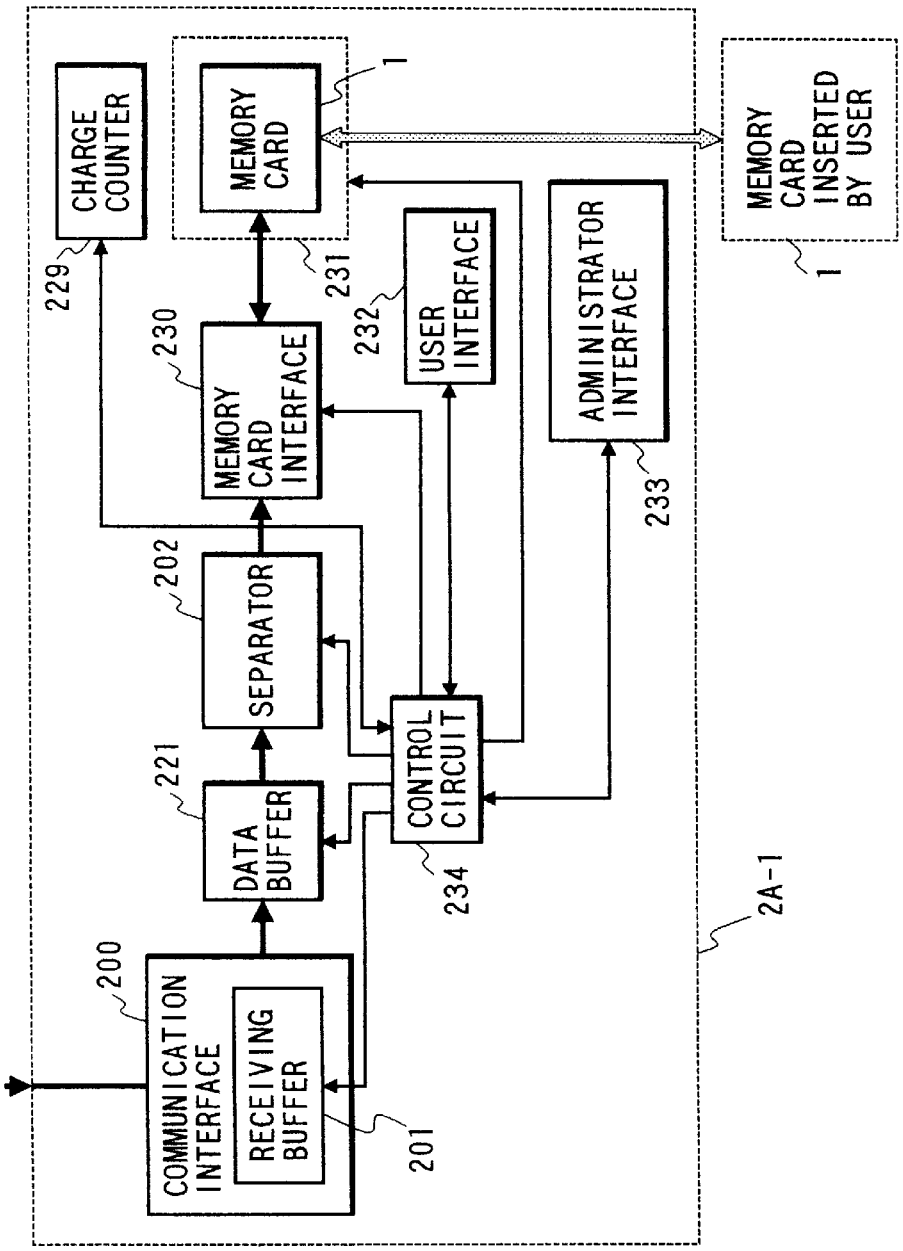
FIG. 21 is a block diagram showing another example of the write terminal.

FIG. 21 shows another example of the write terminal. The write terminal 2A-1, as shown in FIG. 21, is different from that of FIG. 16 in that the external interface for receiving the electronic information is limited to the communication interface 200 and in that the card stock 225 of the memory cards is not provided so that the sales are made by loading the memory card, as inserted by the user, individually with the electronic information. The electronic information, stored in the data buffer 221, is separated by the separator 202 into a text information and a motion image information. Of these, the text information is formatted into a text file whereas the motion image information is formatted into a graphic file, and it is stored in the memory card 1 through a memory card interface 230. This memory card interface 230 receives the memory card 1, and reads, erases and writes the data. The write terminal 2A-1 of the present embodiment sells only the electronic information when the memory card 1 is inserted. A card machine 231 receives the memory card 1 and gives out the card with written electronic information. The terminal is equipped with a user interface 232 including a user operation panel for performing the operations for the user to purchase the electronic information, and an administrator interface 233 including an administrator operation panel for the administrator to administer the write terminal. The user interface 232 and the administrator interface 233 constitute the operation unit together. The control circuit 234 administers the entirety of the write terminal 2A-1 in accordance with a preset program. This write terminal 2A-1 takes the provided information data from the information distributor through the communication line, stores it in the data buffer 211, and writes the information data of the designated name into the card to give the data to the user. Incidentally, the remaining construction is similar to that of FIG. 16, and the detailed description of the circuit blocks having the identical functions will be omitted by designating them with the identical reference numerals.

Figure 22:
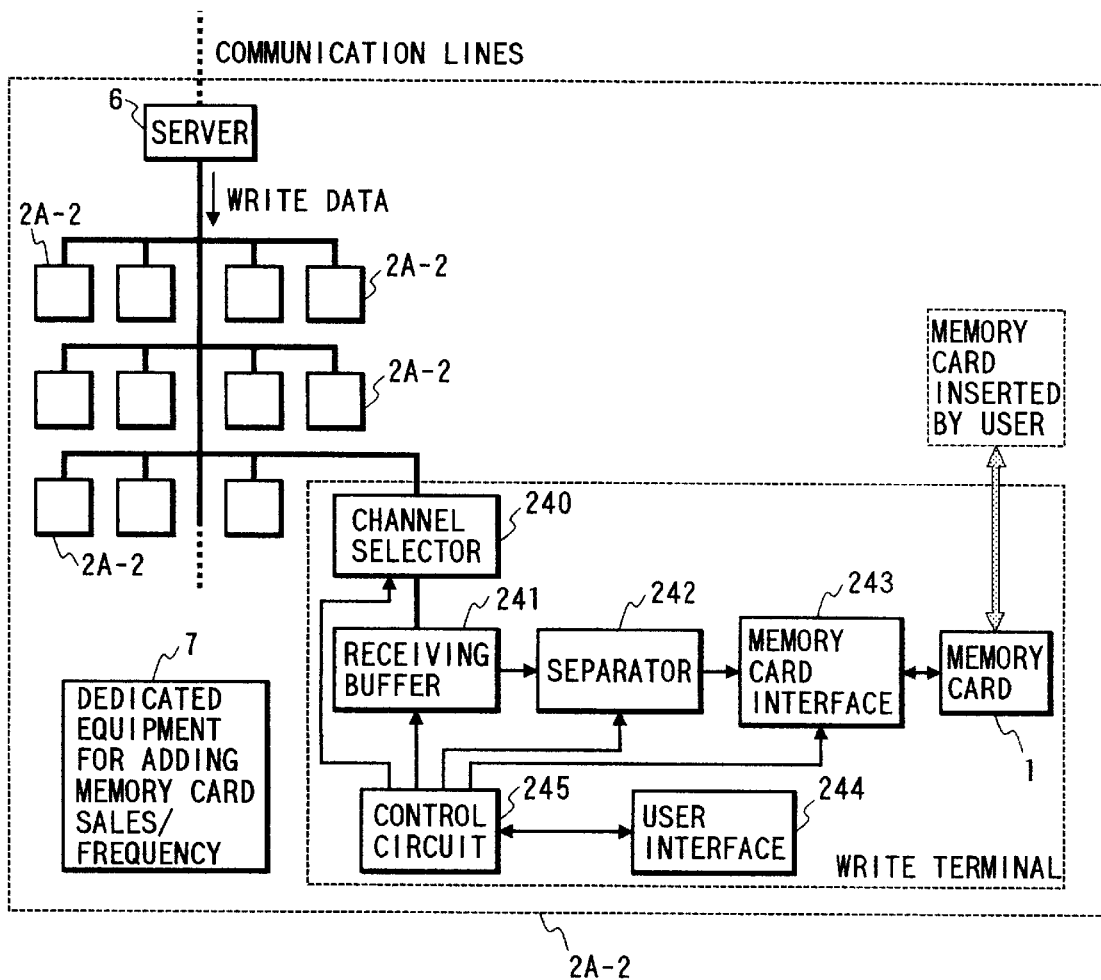
FIG. 22 is a block diagram of one example of the system for realizing the service to load the memory card with the information which is significant in a local area.

FIG. 22 shows an example of the system construction for realizing the services to write information, which is significant in a local area (or limited place), into memory cards. This limited place may be exemplified by a train, an airplane, a hall, a sports ground, a school or a hospital. A server 6 and a write terminal 2A-2 are connected through a LAN (i.e., Local Area Network) so that the information held by the server 6 is usually sent in parallel to the individual terminals 2A-2. In this case, a small-sized inexpensive write terminal 2A-2 is placed on each seat of the train, the airplane, the hall, the sports ground or the school so that the user can write the memory card at his seat. However, what can be selected at a time by the user is restricted to ten kinds or the like at most. The information to be provided may be a time table, a travel guide book, an instant motion picture of sports or the voice of an encored song of a concert. In FIG. 22, the individual write terminals 2A-2 are interfaced with the LAN line by a channel selector 240. The electronic information to be transmitted from the LAN line through the channel selector 240 is temporarily stored in a receiving buffer 241, and the electronic information thus stored is separated by a separator 242 into the graphic file and the text file and fed to a memory card interface 243. This memory card interface 243 writes the graphic file and the text file separately in the memory card. The operation such as the selection of the electronic information is given from a user interface 244. A control unit 245 controls a channel selector 246, the separator 242 and the memory card interface 243 in accordance with the instruction coming from the user interface 244. In the system of FIG. 22, the fare handling portion is eliminated from the write terminal 2A-2 by installing a dedicated device 7 for adding the memory card sales and frequency on the lobby or the like. Moreover, the write terminal 2A-2 is not equipped with the data buffer because the provided information data need not be temporarily stored as a whole. In the case of the present system, too, the information provided by the newspaper publishing companies can be written by providing the server with the communication interface and the high-capacity buffer memory.

Figure 23:
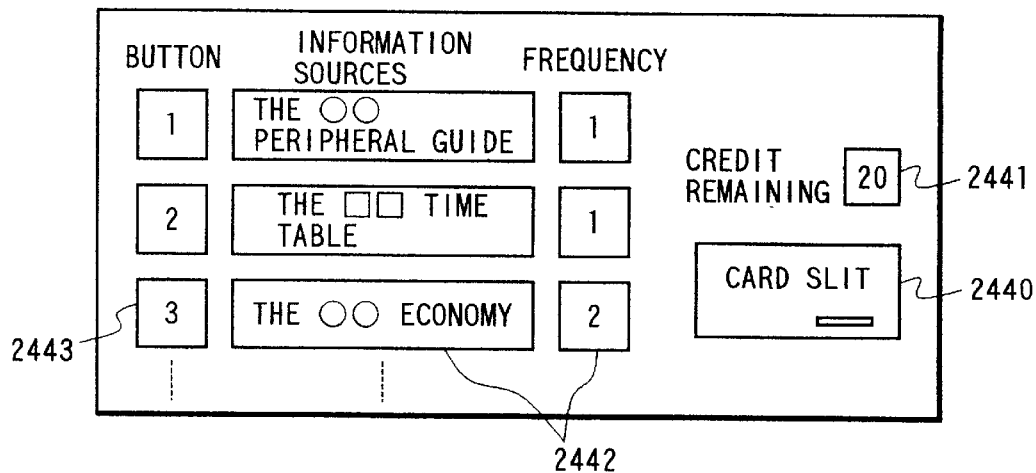
FIG. 23 is an explanatory diagram of the operation panel which is mounted in the user interface of the write terminal of FIG. 22.

FIG. 23 shows an example of the construction of the operation panel to be mounted in the user interface of the write terminal 2A-2 of FIG. 22. The user's operation panel is arranged on the front face of the write terminal. The user's operation panel comprises a memory card slot 2440; a message unit indicator 2441 for indicating the balance in the memory card prepaid for a given number of units; an indicator 2442 of the information name to be sold and the number of message units required for the sales; and buttons 2443 for selecting the name of information to be purchased. Incidentally, there may be indicated the distribution time or edition of the information and the demonstration of a portion of the information content.

The following effects can be attained according to the foregoing individual embodiments.

[1] According to the electronic information distributing terminal 2A of FIG. 16 having the card stock 225 having the electronic information stored in advance, even in case the purchaser inserts his memory card to demand the distribution of only the electronic information, the information distribution can be promptly serviced by discharging the memory cards 1 of the card stock 225 while making it unnecessary to write information into the inserted memory cards individually. Since, at this time, the inserted memory card is utilized as the new card stock 225, the stocked cards are reduced only in case a memory card 1 is newly purchased, so that the card stock 225 need not be frequently supplied. Since the electronic information to be written in the memory card 1 is received through the communication interface 200, the information having the content to be quickened such as the newspaper information can be distributed, and no work is required for updating the information to be distributed.

[2] The aforementioned memory card 1 has an area MEM1 for recording the information (i.e., the guaranteed number of rewrite operations MO or the limit B) indicating the limit of rewriting electronic information, and an area MEM2 for recording the actual number of rewrite operations M, wherein when the actual number reaches a predetermined value the memory card 1 ends its service in the card stock 225 so that the electronic information is rewritten by updating the available number till it reaches the predetermined value. As a result, the reliability of the information distribution can be retained under the circumstances in which the number of rewrite operations of the nonvolatile semiconductor memory is limited. Specifically, the expired memory card 1 can be recovered and replaced without bothering the user to prevent the undesired expiration of the memory card 1 so that the reliability for selling the electronic information can be improved.

[3] There are provided the operation unit (205, 413, 226) for selecting the kind of the electronic information demanding the distribution; and the accounting means (206, 229) for collecting the charge for the distribution of the electronic information. As a result, it is possible to realize the electronic information distributing terminal like an automatic vendor.

[4] When the desired information is selected from the electronic information stored in the data buffer 411, as shown in FIG. 8, the cost for the distribution of the information can be collected to satisfy both the improvement in the information distribution service and the propriety for the charge.

[5] Thanks to the data buffer 411, as shown in FIG. 8, and the data buffer 221 for temporarily storing the electronic information fed from the communication interface 200, as shown in FIG. 21, it is possible to shorten the time required from the demand for the distribution of the electronic information to the completion of writing the electronic information.

[6] By storing the separated text information and motion image information separately in the memory card 1, the portable display terminal 4 for reproducing the text information and the motion image information need not be provided with circuit means for separating the text information and the motion image information so that the portability of the portable display terminal 4 can be enhanced.

[7] The text information stored in the storage means and a portion of the corresponding motion image information are displayed as a static image in the display unit 403 so that the static image is reproduced as a motion image, if necessary. As a result, at the time of reproducing the distributed electronic information, as to the mode of displaying the text information and the motion image information, information can be displayed clearly and more information can be displayed, if necessary.

Although our invention has been specifically described in connection with its preferred embodiments, it should not be limited to those embodiments but can naturally be modified in various manners without departing from the gist thereof. For example, the separation of the text information and the motion image information can be effected by the portable display terminal (or the distributed electronic information reproducing system). In this case, the image information and the text information are stored in the memory card while being separated on the storage area. Moreover, the specific construction of the user interface should not be limited to the foregoing embodiments.

Industrial Applicability

As described hereinbefore, the present invention can be applied to a terminal for distributing newspaper information having motion images, a system for reproducing the newspaper information having the motion images, and a memory card acting as a storage medium for storing the newspaper information. In addition, the present invention can be applied to a system for distributing, reproducing and storing the electronic information, including newspaper information having the motion images as well as information of other periodic publications, or books.

What is claimed is:

1. An electronic information distributing terminal for writing electronic information into a memory card equipped with an electrically rewritable nonvolatile semiconductor memory device to distribute the information, comprising:

a communication interface through which the electronic information is received for storing into a memory card;

means for distributing the electronic information by issuing a memory card from card stock which is provided in the terminal and in which the electronic information is written before a demand for distributing the electronic information is made, in response to the demand for distributing the electronic information;

means for checking a memory card inserted with the demand;

means for adding the memory card inserted with the demand to the card stock so that the memory card inserted with the demand is used as a memory card for holding electronic information if the checking means determines that the memory card inserted with the demand is usable; and means for reading user data from the memory card inserted with the demand and writing the user data in the memory card to be issued.

2. An electronic information distributing terminal as set forth in claim 1, wherein each of the memory cards in the card stock has an area for holding a predetermined number, and an area for recording an executing number of rewrite operations; and wherein the checking means checks whether the executing number of rewrite operations reaches the predetermined number, and permits the adding means to add the memory card to the card stock if the executing number of rewrite operations has not reached the predetermined number.

3. An electronic information distributing terminal as set forth in claim 2, further comprising an operation unit for selecting the kind of the electronic information demanded for the distribution; and accounting means for collecting a charge for the distribution of the electronic information.

4. An electronic information distributing terminal as set forth in claim 2, wherein the predetermined number indicates a maximum number of rewrite operations of a memory card.

5. An electronic information distributing terminal as set forth in claim 1, further comprising:

a data buffer for temporarily storing the electronic information fed from the communication interface, the electronic information including text information and its corresponding motion video information;

a memory card interface which is arranged to receive the electronic information from the data buffer and writes one of the motion video information and the text information thereof into the memory card in a direction from a first address to a second address on the memory card, and writes the other of the motion video information and the text information in a direction from the second address to the first address so that the memory card separately stores the text information and the corresponding motion video information received from said data buffer;

an operation unit for selecting which of the electronic information is to be stored in the memory card from the data buffer; and accounting means for collecting a charge for the electronic information selected by the operation unit.

6. An electronic information distributing terminal as set forth in claim 1, wherein the electronic information written to the memory card before the demand includes text information and its corresponding motion video information.

7. An electronic information distributing terminal for writing electronic information into a memory card equipped with an electrically rewritable nonvolatile semiconductor memory device to distribute the information, comprising:

a communication interface;

a card stock provided in the terminal, including a plurality of memory cards in each of which electronic information distributed through the communication interface has been held;

a control unit which checks a memory card inserted with a demand for distributing the electronic information, which adds the memory card inserted with the demand to the card stock so that the memory card inserted with a demand is used as a memory card for holding electronic information if the checking operation determines that the memory card inserted with the demand is usable, and which permits a memory card to be issued from a card stock in response to the demand; and means for reading user data from the memory card inserted with the demand and writing the user data in the memory card to be issued.

\* \* \* \* \*